US011910269B2

(12) United States Patent
Drummond et al.

(10) Patent No.: US 11,910,269 B2
(45) Date of Patent: Feb. 20, 2024

(54) AUGMENTED REALITY CONTENT ITEMS INCLUDING USER AVATAR TO SHARE LOCATION

(71) Applicant: Snap Inc., Santa Monica, CA (US)

(72) Inventors: Virginia Drummond, Venice, CA (US); Jean Luo, Los Angeles, CA (US); Alek Matthiessen, Marina Del Rey, CA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 55 days.

(21) Appl. No.: 17/203,346

(22) Filed: Mar. 16, 2021

(65) Prior Publication Data

US 2022/0103969 A1 Mar. 31, 2022

Related U.S. Application Data

(60) Provisional application No. 63/083,733, filed on Sep. 25, 2020.

(51) Int. Cl.
*H04W 4/02* (2018.01)
*G06T 19/00* (2011.01)
(Continued)

(52) U.S. Cl.
CPC ............. *H04W 4/023* (2013.01); *G06T 13/40* (2013.01); *G06T 19/006* (2013.01);
(Continued)

(58) Field of Classification Search
CPC ....... H04W 4/023; H04W 4/21; H04W 4/025; H04W 4/12; G06T 13/40; G06T 19/006
See application file for complete search history.

(56) References Cited

U.S. PATENT DOCUMENTS

| 5,880,731 A | 3/1999 | Liles et al. |
| 6,023,270 A | 2/2000 | Brush, II et al. |

(Continued)

FOREIGN PATENT DOCUMENTS

| CN | 109863532 | 6/2019 |
| CN | 110168478 | 8/2019 |

(Continued)

OTHER PUBLICATIONS

"International Application Serial No. PCT/US2021/051761, International Search Report dated Dec. 21, 21", 4 pgs.

(Continued)

*Primary Examiner* — Umair Ahsan
(74) *Attorney, Agent, or Firm* — Schwegman Lundberg & Woessner, P.A.

(57) ABSTRACT

In one or more implementations, a user of a client application may share the location of the user in relation to an avatar of the user. In various examples, an avatar-based location sharing user interface element may be selectable to execute an augmented reality content item that is executable to make the location of the user accessible to one or more additional users of the client application. In one or more examples, a message may be generated that includes user content captured at a location of the user, an avatar of the user, and location information related to the location of the user. In one or more additional examples, the location of the user may be accessible via a map user interface that displays the avatar of the user at the location of the user within a geographic region.

20 Claims, 11 Drawing Sheets

(51) Int. Cl.
  *H04W 4/21*  (2018.01)
  *G06T 13/40*  (2011.01)
  *H04W 4/12*  (2009.01)
(52) U.S. Cl.
  CPC ............ *H04W 4/025* (2013.01); *H04W 4/12* (2013.01); *H04W 4/21* (2018.02)

(56) References Cited

U.S. PATENT DOCUMENTS

| | | | |
|---|---|---|---|
| 6,223,165 | B1 | 4/2001 | Lauffer |
| 6,772,195 | B1 | 8/2004 | Hatlelid et al. |
| 6,842,779 | B1 | 1/2005 | Nishizawa |
| 7,342,587 | B2 | 3/2008 | Danzig et al. |
| 7,468,729 | B1 | 12/2008 | Levinson |
| 7,636,755 | B2 | 12/2009 | Blattner et al. |
| 7,639,251 | B2 | 12/2009 | Gu et al. |
| 7,775,885 | B2 | 8/2010 | Van Luchene et al. |
| 7,859,551 | B2 | 12/2010 | Bulman et al. |
| 7,885,931 | B2 | 2/2011 | Seo et al. |
| 7,925,703 | B2 | 4/2011 | Dinan et al. |
| 8,088,044 | B2 | 1/2012 | Tchao et al. |
| 8,095,878 | B2 | 1/2012 | Bates et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,146,005 | B2 | 3/2012 | Jones et al. |
| 8,151,191 | B2 | 4/2012 | Nicol |
| 8,384,719 | B2 | 2/2013 | Reville et al. |
| RE44,054 | E | 3/2013 | Kim |
| 8,396,708 | B2 | 3/2013 | Park et al. |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,581,911 | B2 | 11/2013 | Becker et al. |
| 8,597,121 | B2 | 12/2013 | del Valle |
| 8,601,051 | B2 | 12/2013 | Wang |
| 8,601,379 | B2 | 12/2013 | Marks et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,890,926 | B2 | 11/2014 | Tandon et al. |
| 8,892,999 | B2 | 11/2014 | Nims et al. |
| 8,924,250 | B2 | 12/2014 | Bates et al. |
| 8,963,926 | B2 | 2/2015 | Brown et al. |
| 8,989,786 | B2 | 3/2015 | Feghali |
| 9,086,776 | B2 | 7/2015 | Ye et al. |
| 9,105,014 | B2 | 8/2015 | Collet et al. |
| 9,241,184 | B2 | 1/2016 | Weerasinghe |
| 9,256,860 | B2 | 2/2016 | Herger et al. |
| 9,298,257 | B2 | 3/2016 | Hwang et al. |
| 9,314,692 | B2 | 4/2016 | Konoplev et al. |
| 9,330,483 | B2 | 5/2016 | Du et al. |
| 9,357,174 | B2 | 5/2016 | Li et al. |
| 9,361,510 | B2 | 6/2016 | Yao et al. |
| 9,378,576 | B2 | 6/2016 | Bouaziz et al. |
| 9,402,057 | B2 | 7/2016 | Kaytaz et al. |
| 9,412,192 | B2 | 8/2016 | Mandel et al. |
| 9,426,239 | B2 * | 8/2016 | McCandless ........ G06Q 10/107 |
| 9,460,541 | B2 | 10/2016 | Li et al. |
| 9,489,760 | B2 | 11/2016 | Li et al. |
| 9,503,845 | B2 | 11/2016 | Vincent |
| 9,508,197 | B2 | 11/2016 | Quinn et al. |
| 9,544,257 | B2 | 1/2017 | Ogundokun et al. |
| 9,576,400 | B2 | 2/2017 | Van Os et al. |
| 9,589,357 | B2 | 3/2017 | Li et al. |
| 9,592,449 | B2 | 3/2017 | Barbalet et al. |
| 9,648,376 | B2 | 5/2017 | Chang et al. |
| 9,697,635 | B2 | 7/2017 | Quinn et al. |
| 9,706,040 | B2 | 7/2017 | Kadirvel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,792,714 | B2 | 10/2017 | Li et al. |
| 9,839,844 | B2 | 12/2017 | Dunstan et al. |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,116,598 | B2 | 10/2018 | Tucker et al. |
| 10,155,168 | B2 | 12/2018 | Blackstock et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,362,219 | B2 | 7/2019 | Wilson et al. |
| 10,454,857 | B1 | 10/2019 | Blackstock et al. |
| 10,475,225 | B2 | 11/2019 | Park et al. |
| 10,504,266 | B2 | 12/2019 | Blattner et al. |
| 10,573,048 | B2 | 2/2020 | Ni et al. |
| 10,657,701 | B2 | 5/2020 | Osman et al. |
| 11,380,077 | B2 * | 7/2022 | Scapel ................ G06F 3/04883 |
| 2002/0067362 | A1 | 6/2002 | Agostino Nocera et al. |
| 2002/0169644 | A1 | 11/2002 | Greene |
| 2005/0162419 | A1 | 7/2005 | Kim et al. |
| 2005/0206610 | A1 | 9/2005 | Cordelli |
| 2006/0294465 | A1 | 12/2006 | Ronen et al. |
| 2007/0113181 | A1 | 5/2007 | Blattner et al. |
| 2007/0168863 | A1 | 7/2007 | Blattner et al. |
| 2007/0176921 | A1 | 8/2007 | Iwasaki et al. |
| 2008/0158222 | A1 | 7/2008 | Li et al. |
| 2009/0016617 | A1 | 1/2009 | Bregman-amitai et al. |
| 2009/0055484 | A1 | 2/2009 | Vuong et al. |
| 2009/0070688 | A1 | 3/2009 | Gyorfi et al. |
| 2009/0099925 | A1 | 4/2009 | Mehta et al. |
| 2009/0106672 | A1 | 4/2009 | Burstrom |
| 2009/0158170 | A1 | 6/2009 | Narayanan et al. |
| 2009/0177976 | A1 | 7/2009 | Bokor et al. |
| 2009/0202114 | A1 | 8/2009 | Morin et al. |
| 2009/0265604 | A1 | 10/2009 | Howard et al. |
| 2009/0300525 | A1 | 12/2009 | Jolliff et al. |
| 2009/0303984 | A1 | 12/2009 | Clark et al. |
| 2010/0011422 | A1 | 1/2010 | Mason et al. |
| 2010/0023885 | A1 | 1/2010 | Reville et al. |
| 2010/0115426 | A1 | 5/2010 | Liu et al. |
| 2010/0162149 | A1 | 6/2010 | Sheleheda et al. |
| 2010/0203968 | A1 | 8/2010 | Gill et al. |
| 2010/0227682 | A1 | 9/2010 | Reville et al. |
| 2011/0093780 | A1 | 4/2011 | Dunn |
| 2011/0115798 | A1 | 5/2011 | Nayar et al. |
| 2011/0148864 | A1 | 6/2011 | Lee et al. |
| 2011/0239136 | A1 | 9/2011 | Goldman et al. |
| 2012/0113106 | A1 | 5/2012 | Choi et al. |
| 2012/0124458 | A1 | 5/2012 | Cruzada |
| 2012/0130717 | A1 | 5/2012 | Xu et al. |
| 2013/0103760 | A1 | 4/2013 | Golding et al. |
| 2013/0201187 | A1 | 8/2013 | Tong et al. |
| 2013/0249948 | A1 | 9/2013 | Reitan |
| 2013/0257877 | A1 | 10/2013 | Davis |
| 2014/0043329 | A1 | 2/2014 | Wang et al. |
| 2014/0055554 | A1 | 2/2014 | Du et al. |
| 2014/0125678 | A1 | 5/2014 | Wang et al. |
| 2014/0129343 | A1 | 5/2014 | Finster et al. |
| 2015/0206349 | A1 | 7/2015 | Rosenthal et al. |
| 2016/0134840 | A1 | 5/2016 | Mcculloch |
| 2016/0192315 | A1 * | 6/2016 | Paek ...................... H04W 64/00 |
| | | | 455/456.1 |

(56) References Cited

U.S. PATENT DOCUMENTS

| | | | |
|---|---|---|---|
| 2016/0234149 A1 | 8/2016 | Tsuda et al. | |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0235848 A1 | 8/2017 | Van Deusen et al. | |
| 2017/0310934 A1 | 10/2017 | Du et al. | |
| 2017/0312634 A1 | 11/2017 | Ledoux et al. | |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0300916 A1 | 10/2018 | Barnett et al. | |
| 2018/0315076 A1 | 11/2018 | Andreou | |
| 2018/0315133 A1 | 11/2018 | Brody et al. | |
| 2018/0315134 A1 * | 11/2018 | Amitay | G06Q 50/01 |
| 2019/0001223 A1 | 1/2019 | Blackstock et al. | |
| 2019/0057616 A1 | 2/2019 | Cohen et al. | |
| 2019/0188920 A1 | 6/2019 | Mcphee et al. | |
| 2020/0334463 A1* | 10/2020 | Shapira | G06T 19/006 |

FOREIGN PATENT DOCUMENTS

| | | | |
|---|---|---|---|
| CN | 116235131 | | 6/2023 |
| EP | 2184092 | | 5/2010 |
| JP | 2001230801 | | 8/2001 |
| JP | 5497931 | | 3/2014 |
| KR | 101445263 | | 9/2014 |
| KR | 20180006953 A | * | 1/2018 |
| WO | 2003094072 | | 11/2003 |
| WO | 2004095308 | | 11/2004 |
| WO | 2006107182 | | 10/2006 |
| WO | 2007134402 | | 11/2007 |
| WO | 2012139276 | | 10/2012 |
| WO | 2013027893 | | 2/2013 |
| WO | 2013152454 | | 10/2013 |
| WO | 2013166588 | | 11/2013 |
| WO | 2014031899 | | 2/2014 |
| WO | 2014194439 | | 12/2014 |
| WO | 2016090605 | | 6/2016 |
| WO | 2018081013 | | 5/2018 |
| WO | 2018102562 | | 6/2018 |
| WO | 2018129531 | | 7/2018 |
| WO | 2019089613 | | 5/2019 |
| WO | 2022066914 | | 3/2022 |

OTHER PUBLICATIONS

"International Application Serial No. PCT/US2021/051761, Written Opinion dated Dec. 21, 21", 6 pgs.
"International Application Serial No. PCT US2021 051761, International Preliminary Report on Patentability dated Apr. 6, 2023", 8 pgs.

* cited by examiner

AUGMENTED REALITY CONTENT ITEMS INCLUDING USER AVATAR TO SHARE LOCATION

CLAIM OF PRIORITY

This application claims the benefit of priority to U.S. Provisional Application Ser. No. 63/083,733, filed on Sep. 25, 2020, which is incorporated herein by reference in its entirety.

BACKGROUND

Applications executed by client devices may be used to generate content. For example, client applications may be used to generate messaging content, image content, video content, audio content, media overlays, documents, creative works, combinations thereof, and the like. In various situations, client applications may also be used to share locations of users of the client applications.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
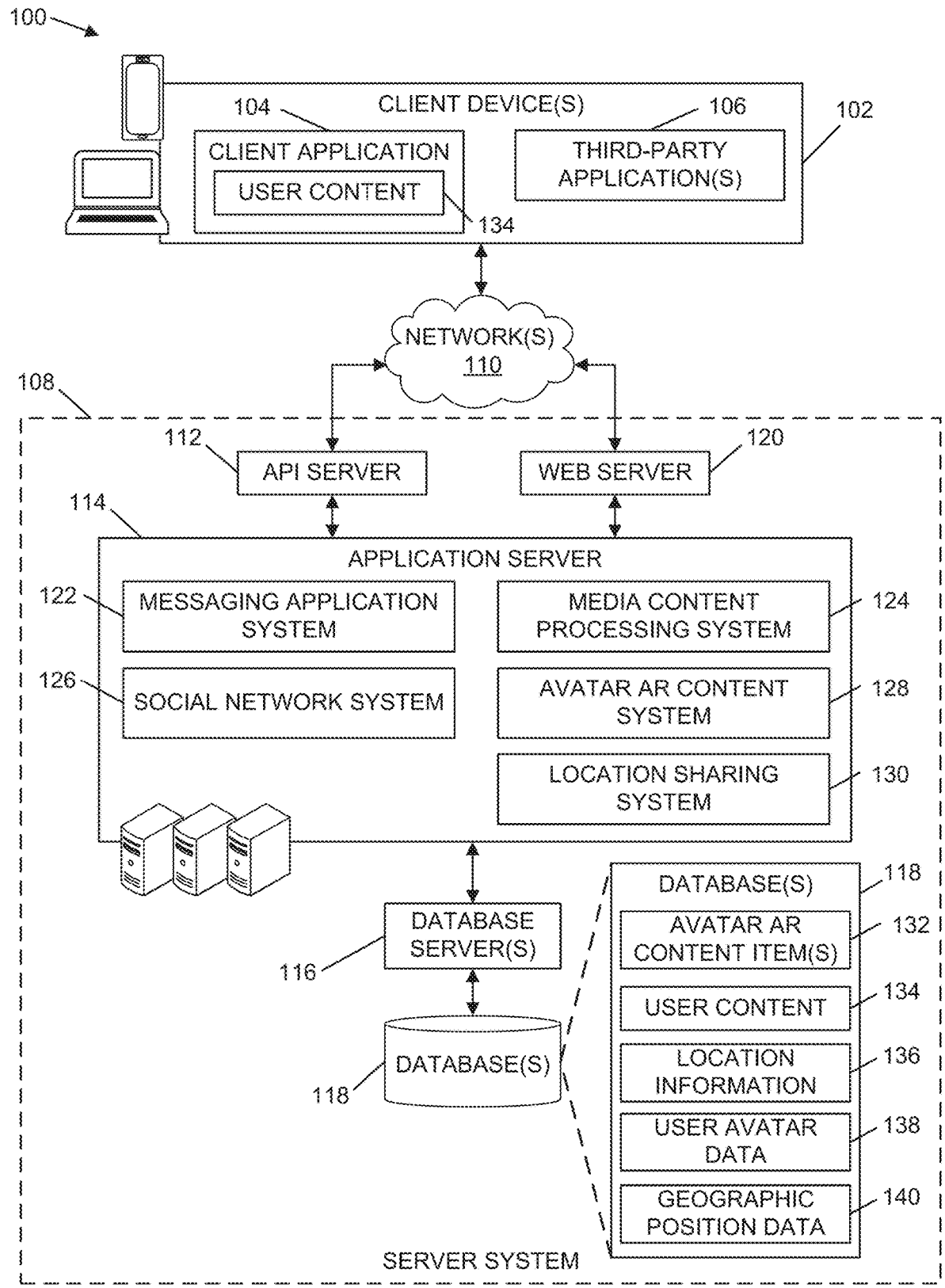
FIG. 1 is a diagrammatic representation of an architecture for exchanging data (e.g., messages and associated content) over a network, according to one or more example implementations.

Augmented reality content may be used to modify user content that may be produced using a client application. For example, user content may include at least one of video content, image content, or audio content that is captured by one or more input devices of a client device, such as at least one of one or more cameras or one or more microphones. In various examples, augmented reality content items may be executable to display an avatar that is a visual representation of a user in one or more client applications, such as messaging applications, social networking applications, gaming applications, and the like. The avatar may be customized by including characteristics that are related to an individual user. To illustrate, an avatar may represent features of a user, such as bodily features, facial features, clothing, accessories, and so forth. In one or more examples, an avatar may be generated based on one or more images of a user. The avatar may also be displayed in conjunction with at least one of one or more additional objects or text content. The avatar may be two-dimensional or three-dimensional. Further, one or more portions of the avatar may be associated with motion. In one or more additional examples, one or more portions of an avatar may be stationary.

In scenarios where augmented reality content items are executable to display an avatar of a user of a client application, the augmented reality content item may be executed to modify user content by applying one or more visual effects to the user content. In one or more implementations, the one or more visual effects may include displaying an avatar of a user within the user content. For example, an avatar may overlay a portion of the user content. In addition, the avatar may be displayed as an annotation with respect to the user content. Executing augmented reality content items associated with an avatar with respect to user content may produce modified user content that may be shared by the user of the client application with one or more additional users of the client application.

Additionally, users of client applications may share their locations with other users. In existing systems, users of client applications may share their location by including one or more location indicators in a post of a social networking application. In one or more examples, the location of a user of a client application may be determined based on geographic position data, such as geographic positioning system (GPS) data or communications network data (e.g., wide area wireless network data, local area wireless network data, etc.) that is obtained by a client device of the user. Users of client applications may also share their location by enabling location tracking features with respect to additional users of the client applications. In one or more examples, the location of a user may be indicated on a user interface that includes a map of a geographic area.

In existing systems, however, a location of a user is not tied to the execution of an augmented reality content item, such as an augmented reality content item that is executable to display an avatar of a user of a client application. Accordingly, users of existing systems and client applications that want to share their location, as well as share user content that has been modified by an augmented reality content item, are unable to directly share their location by executing an augmented reality content item. Instead, users of existing systems perform separate operations to execute augmented reality content items to create modified user content and to share their location. Thus, existing systems can be inefficient with regard to the computational resources and the time utilized by users to both share user content that has been modified by executing an augmented reality content item and share the location of the users.

The systems, methods, techniques, instruction sequences, and computing machine program products described herein are directed to augmented reality content items that may be executed to share a location of a user of a client application. Implementations of augmented reality content items may be executed in response to selection of a user interface element that is displayed within a user interface of the client application. The user interface element may be one of a number of user interface elements included in the user interface with each user interface element being selectable to execute a different augmented reality content item. In addition to the user interface element, the user interface may include user content that is captured by one or more cameras of a client device that is executing an instance of the client application. In one or more examples, the user content may include a live view of the location of the user. In one or more additional examples, the user content may include image content or video content previously captured by one or more cameras of the client device.

The augmented reality content items may be executable to display an avatar of the user of the client application. In one or more examples, an augmented reality content item may be executable to modify user content by displaying an avatar of a user in relation to user content. The augmented reality content item may also be executable to display information related to the location of the user in relation to the user content. For example, a user of a client application may be located in a restaurant and capture an image of food served at the restaurant. The user may execute an augmented reality content item to produce modified user content that includes the image and an avatar of the user within the image. The augmented reality content item may also be executable to generate modified user content that displays information associated with the restaurant within the image, such as a name of the restaurant, an identifier of a menu item that corresponds to the food included in the image, a rating of the restaurant, and the like. The modified user content that includes the avatar of the user and the information of the location of the user may be shared with additional users of the client application, such as via at least one of messaging functionality or social networking functionality of the client application.

Further, execution of the augmented reality content item may also share the location of the user with additional users of the client application, such as contacts or friends of the user. To illustrate, selection of a user interface element that corresponds to the avatar-based location sharing augmented reality content item may cause the location of the user to be accessible to additional users of the client application. In various examples, the location of the user of the client application may be accessible via an additional user interface of the client application that includes a map that is accessible to the additional users of the client application. In these scenarios, the location of the user may be indicated on the map that is accessed by additional users of the client application in response to selection of the user interface element that corresponds to the avatar-based location sharing augmented reality content item. In one or more illustrative examples, the location of the user on the map may be indicated by the avatar of the user.

Accordingly, the systems, methods, techniques, instruction sequences, and computing machine program products described herein can execute augmented reality content items that generate modified user content related to a location of the user and that includes the avatar of the user. Execution of the augmented reality content items may also cause the location of the user to be shared with other users of the client application. In this way, the implementations described herein provide augmented reality content items that enables users of a client application to check-in with respect to a location using an avatar of the user. As a result, the implementations described herein are different from existing systems that simply enable individuals to check-in at a location using social networking posts or location tracking features because the implementations described herein overcome the inefficiencies of existing systems by allowing a user to execute augmented reality content that both shares the location of the user with other users of the client application and that generates modified user content, where the modified user content includes information about the location of the user and that includes an avatar representing the user.

FIG. 1 is a diagrammatic representation of an architecture 100 for exchanging data (e.g., messages and associated content) over a network. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including a client application 104 and one or more third-party applications 106. A user may use the client application 104 to create content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth.

One or more users may be a person, a machine, or other means of interacting with a client device, such as the client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

Each instance of the client application 104 is able to communicate and exchange data with at least one of another instance of the client application 104, one or more third-party applications 106, or a server system 108. The data exchanged between instances of the client applications 104, between the third-party applications 106, and between instances of the client application 104 and the server system 108 includes functions (e.g., commands to invoke functions) and payload data (e.g., text, audio, image, video, or other multimedia data). Data exchanged between instances of the client applications 104, between the third-party applications 106, and between at least one instance of the client application 104 and at least one third-party application 106 may be exchanged directly from an instance of an application executed by a client device 102 and an instance of an application executed by an additional client device 102. Further, data exchanged between the client applications 104, between the third-party applications 106, and between at least one client application 104 and at least one third-party application 106 may be communicated indirectly (e.g., via one or more intermediate servers) from an instance of an application executed by a client device 102 to another instance of an application executed by an additional client device 102. In one or more illustrative examples, the one or more intermediate servers used in indirect communications between applications may be included in the server system 108.

The third-party application(s) 106 may be separate and distinct from the client application 104. The third-party application(s) 106 may be downloaded and installed by the client device 102 separately from the client application 104. In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In one or more implementations, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 108 provides server-side functionality via one or more networks 110 to the client application 104. The server system 108 may be a cloud computing environment, according to some example implementations. For example, the server system 108, and one or more servers associated with the server system 108, may be associated with a cloud-based application, in one illustrative example. In one or more implementations, the client device 102 and the server system 108 may be coupled via the one or more networks 110.

The server system 108 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples. Data exchanges within the architecture 100 are invoked and controlled through functions available via user interfaces (ins) of the client application 104.

While certain functions of the architecture 100 are described herein as being performed by either a client application 104 or by the server system 108, the location of functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 includes an Application Programming Interface (API) server 112 that is coupled to, and provides a programmatic interface to, an application server 114. The application server 114 is communicatively coupled to a database server 116 that facilitates access to one or more databases 118. The one or more databases 118 may store data associated with information processed by the application server 114. The one or more databases 118 may be storage devices that store information such as untreated media content, original media content from users (e.g., high-quality media content), processed media content (e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 118 may further store information related to third-party servers, client devices 102, client applications 104, users, third-party applications 106, and so forth.

The API server 112 receives and transmits data (e.g., commands and message payloads) between client devices 102 and the application server 114. Specifically, the Application Program Interface (API) server 112 provides a set of interfaces (e.g., routines and protocols) that can be called or queried by the client application 104 in order to invoke functionality of the application server 114. The Application Program Interface (API) server 112 exposes various functions supported by the application server 114, including account registration, login functionality, the sending of messages, via the application server 114, from one instance of the client application 104 to another instance of the client application 104, the sending of media files (e.g., images, audio, video) from a client application 104 to the application server 114, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104).

The server system 108 may also include a web server 120. The web server 120 is coupled to the application servers 114, and provides web-based interfaces to the application servers 114. To this end, the web server 120 processes incoming network requests over the Hypertext Transfer Protocol (HTTP) and several other related protocols.

The application server 114 hosts a number of applications and subsystems, including a messaging application system 122, a media content processing system 124, a social network system 126, an avatar augmented reality (AR) content system 128, and a location sharing system 130. The messaging application system 122 implements a number of message processing technologies and functions, particularly related to the aggregation and other processing of content (e.g., textual and multimedia content) included in messages received from multiple instances of the client application 104. For example, the messaging application system 122 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 122 may aggregate text and media content from multiple sources into collections of content. These collections are then made available, by the messaging application system 122, to the client application 104. Other processor- and memory-intensive processing of data may also be performed server-side by the messaging application system 122, in view of the hardware requirements for such processing.

The media content processing system 124 is dedicated to performing various media content processing operations, typically with respect to images, audio, or video received within the payload of a message or other content item at the messaging application system 122. The media content processing system 124 may access one or more data storages (e.g., the database(s) 118) to retrieve stored data to use in processing media content and to store results of processed media content.

The social network system 126 supports various social networking functions and services, and makes these functions and services available to the messaging application system 122. To this end, the social network system 126 maintains and accesses an entity graph within the database(s) 118. Examples of functions and services supported by the social network system 126 include the identification of other users of the client application 104 with which a particular user has relationships or is "following", and also the identification of other entities and interests of a particular user. The social network system 126 may access location information associated with each of the user's friends or other social network connections to determine where they live or are currently located geographically. In addition, the social network system 126 may maintain a location profile for each of the user's friends indicating the geographical location where the user's friends live.

The avatar AR content system 128 may generate one or more avatar AR content items 132 that may be executable to display an avatar of a user of the client application 104 in conjunction with user content 134. The user content 134 may include at least one of image content, video content, or audio content captured by one or more input devices of the client device 102, such as one or more microphones or one or more cameras. The user content 134 may be captured live by the one or more input devices of the client device 102. In one or more examples, the avatar AR content 132 may cause location information 136 corresponding to a location of the user of the client application 104 to be displayed in addition to the avatar of the user and the user content 134. The avatar AR content system 128 may operate in conjunction with the location sharing system 130 to cause the geographic position of a user of the client application 104 to be accessible to other users of the client application 104.

The avatar AR content items 132 may include computer-executable instructions that modify the user content 134 by applying one or more visual effects to the user content 134. The one or more visual effects may change an appearance of one or more objects included in the user content 134. In one or more illustrative examples, one or more visual effects of the avatar AR content items 132 may change one or more facial features of an individual included in the user content 134. In addition, the avatar AR content items 132 may apply one or more overlays to the user content 134 or one or more other annotations to the user content 134. The one or more overlays may include at least one of image content, video content, or animation content that is placed within a scene shown by the user content 134. In various examples, the avatar AR content items 132 may display an avatar of a user of the client application 104 within the user content 134.

Avatars of users of the client application 104 may be stored in user avatar data 138. The user avatar data 138 may include data corresponding to one or more avatars of individual users of the client application 104. In one or more examples, the user avatar data 138 may include a number of avatars of a user of the client application 104. The one or more avatars of a user of the client application 104 may be generated using one or more images of the user. In this way, one or more avatars of a user of the client application 104 may be a graphical representation of the user within the client application 104, example, the avatar of the user may be included in messages generated using the client application 104. In one or more additional examples, the avatar of the user may indicate a location of the user in one or more map user interfaces of the client application 104. Further, the avatar of the user may represent the user within one or more games in which the user participates via the client application 104.

In various examples, the avatar AR content system 128 may generate an avatar of a user of the client application 104 by identifying facial features of the user within one or more images, such as a mouth of the user, eyes of the user, nose of the user, chin of the user, cheeks of the user, face shape, skin tone, hair features (e.g., color, length, type, style), jaw shape, eyebrows, and the like. The avatar AR content system 128 may also generate regions of an avatar of the user that correspond to facial features of the user, such that the avatar of the user resembles the user. Various avatars of a user of the client application 104 may have different facial expressions. In addition, different avatars of the user may wear different articles of clothing and/or different accessories.

Further, different avatars of the user may be associated with different poses or different motions. In one or more examples, the user may customize an avatar of the user by selecting one or more templates that may be used with respect to the avatar of the user. The one or more templates may correspond to one or more poses, one or more facial expressions, one or more articles of clothing, one or more objects that the avatar may interact with, and the like.

The avatar AR content system 128 may generate an avatar-based location sharing user interface (UI) element that is selectable to share a location of a user of the client application 104 and to display an avatar of the user in relation to user content 134, where the user content is related to the location of the user. For example, the avatar AR content system 128 may generate an avatar-based location sharing UI element that is displayed in a user interface that includes user content 134, where the user content 134 includes one or more features of a respective location. To illustrate, the user content 134 may include image content or video content that is captured at a location and the user content 134 may be displayed in a user interface of the client application 104. The image content or video content of the location may include a live view of one or more cameras of a client device 102 or the image content or video content associated with the location may have been previously captured using one or more cameras of the client device 102. The avatar-based location sharing UI element may also be displayed in the user interface and may be selectable to display an avatar of the user within the user content 134 that is associated with the location. In one or more illustrative examples, the avatar-based location sharing UI element may be selectable to display an avatar of the user of the client application 104 as an overlay of image content or video content that comprises the user content 134 related to the location. In various examples, the avatar of the user of the client application 104 may be animated within the user content 134 associated with the location. In one or more additional examples, the avatar of the user of the client application 104 may interact with one or more objects included in the user content 134 related to the location.

In one or more implementations, the avatar AR content system 128 may obtain input indicating an avatar of the user of the client application 104 to display in response to selection of the avatar-based location sharing UI element. In one or more examples, the user avatar data 138 may store a plurality of avatars of a user of the client application 104. In these scenarios, the user may identify an avatar of the plurality of avatars to display in response to selection of the avatar-based location sharing UI element. In various examples, a single avatar of the user may correspond to an avatar-based location sharing UI element generated by the avatar AR content system 128. In one or more additional examples, multiple avatars of the user may correspond to a single avatar-based location sharing UI element generated by the avatar AR content system 128. In one or more further examples, the avatar AR content system 128 may generate multiple avatar-based location sharing UI elements with individual avatar-based location sharing UI elements being selectable to display a respective avatar of the user of the client application 104 in relation to user content 134 that is associated with a given location. In this way, multiple avatars of a user of the client application 104 may be displayed in conjunction with the user content 134 based on the location of the user at a given time.

In addition, an avatar of a user of the client application 104 that is displayed in response to selection of an avatar-based location sharing UI element may be customized in relation to a location of the user. To illustrate, the avatar AR content system 128 may generate an avatar AR content item 132 that is related to a business or other entity associated with a respective location. In one or more examples, an avatar AR content item 132 related to a location may be generated based on information obtained from an entity that is located at a respective location. In one or more examples, the avatar AR content item 132 related to a location may include an avatar corresponding to the location. In these scenarios, an avatar of a user of the client application 104 and an avatar related to the location may be displayed in relation to the user content 134 in response to selection of an avatar-based location sharing UI element. In one or more additional examples, the avatar AR content item 132 may include at least one of one or more accessories, one or more articles of clothing, one or more objects, one or more poses, one or more actions, or one or more facial expressions that correspond to the location and that may be applied to an avatar of a user of the client application 104 that selects an avatar-based location sharing UI element. In these scenarios, the avatar AR content system 128 may enable users of the client application 104 to generate avatars that have one or more features related to the location, such as the one or more accessories, the one or more articles of clothing, the one or more objects, the one or more poses, the one or more actions, or the one or more facial expressions that correspond to the location. As a result, an appearance of an avatar of a user of the client application 104 may be modified according to one or more augmented reality content features provided by an entity associated with a location. In one or more illustrative examples, a user of the client application 104 may be located in a coffee shop and selection of an avatar-based location sharing UI element generated by the avatar AR content system 128 may cause an avatar of the user to be displayed holding a cup of coffee or drinking a cup of coffee.

In various examples, in addition to displaying an avatar of the user in response to selection of an avatar-based location sharing LI element, the avatar AR content system 128 may cause the location information 136 to be displayed with respect to the user content 134. The location information 136 may include a name of an entity or business, a logo of an entity or business, image content related to an entity or business, an animation related to an entity or business, another graphic related to an entity or business, audio content related to an entity or business, or one or more combinations thereof. In one or more examples, selection of an avatar-based location sharing UI element may cause at least one of the avatar AR content system 128 or the location sharing system 130 to determine a location of the user of the client application 104.

The location of the user of the client application 104 may be determined based on geographic position data 140. The geographic position data 140 may include geographic position system (GPS) data obtained by the server system 108 from a client device 102 of the user of the client application 104. In one or more additional examples, the geographic position data 140 may include communications network information obtained by the client device 102. The communications network information may include an internee protocol (IP) address, local area wireless network information, or wide area wireless network information. In various examples, the geographic position data 140 may include information obtained from wide area wireless network infrastructure, such as wide area wireless network communication towers. After determining a geographic position of the user of the client application 104, the avatar AR content system 128 may determine one or more businesses, one or more landmarks, one or more buildings, or one or more additional locations that correspond to the geographic position of the user. In response to determining a location of the user of the client application 104, the avatar AR content system 128 may determine an avatar of the user to display in conjunction with the location. The avatar AR content system 128 may also determine one or more items included in the location information 136 that also correspond to the location of the user. The avatar AR content system 128 may then cause the avatar of the user related to the location and the one or more items of the location information 136 that correspond to the location to be displayed as augmented reality content within the user content 134. Continuing with the example from above with the user of the client application 104 being located in a coffee shop, the avatar AR content system 128 may cause an avatar of the user and a name of the coffee shop to be displayed within user content 134, where the user content 134 includes an image of at least one of an interior portion of the coffee shop, an exterior portion of the coffee shop, one or more objects included in the coffee shop, or one or more individual included in the coffee shop.

Further, in response to determining that a user of the client application 104 selected the avatar-based location sharing UI element, the location sharing system 130 may also make the location of the user accessible to one or more additional users of the client application 104. For example, the location sharing system 130 may parse profile data of the user to identify one or more additional users of the client application 104 for which the user has granted permission to access the location of the user. The location sharing system 130 may then make the location of the user available to the one or more additional users. The location of the user may be accessed by the one or more additional users of the client application 104 via one or more user interfaces of the client application 104. To illustrate, the location of the user may be indicated on a user interface of the client application 104 that includes a map showing one or more geographic features. In various examples, the location of the user on the map may be indicated by an avatar of the user. In one or more examples, a name of a business, entity, landmark, or other location may be shown on the map included in the user interface.

Additionally, location of the user of the client application 104 may be shared with the one or more additional users of the client application 104 by sending a message to the one or more additional users or via a social networking post. In one or more illustrative examples, the message or social networking post may include user content 134 that is captured in relation to the location of the user and that includes an avatar of the user within the user content 134. In addition to the user content 134 associated with the location of the user and an avatar of the user, the message or social networking post may also include information related to the location of the user, such as a name of a business, landmark, or geographic feature where the user is located. In implementations where the location of the user of the client application 104 is shared via a message or social networking post, in one or more instances, the location sharing system 130 may identify one or more recipients of the message or social networking post. In one or more examples, the location sharing system 130 may determine one or more recipients of the message or social networking post based on at least one of input from the user indicating the one or more recipients or based on user profile information of the user of the client application 104 indicating the one or more recipients.

Figure 2:
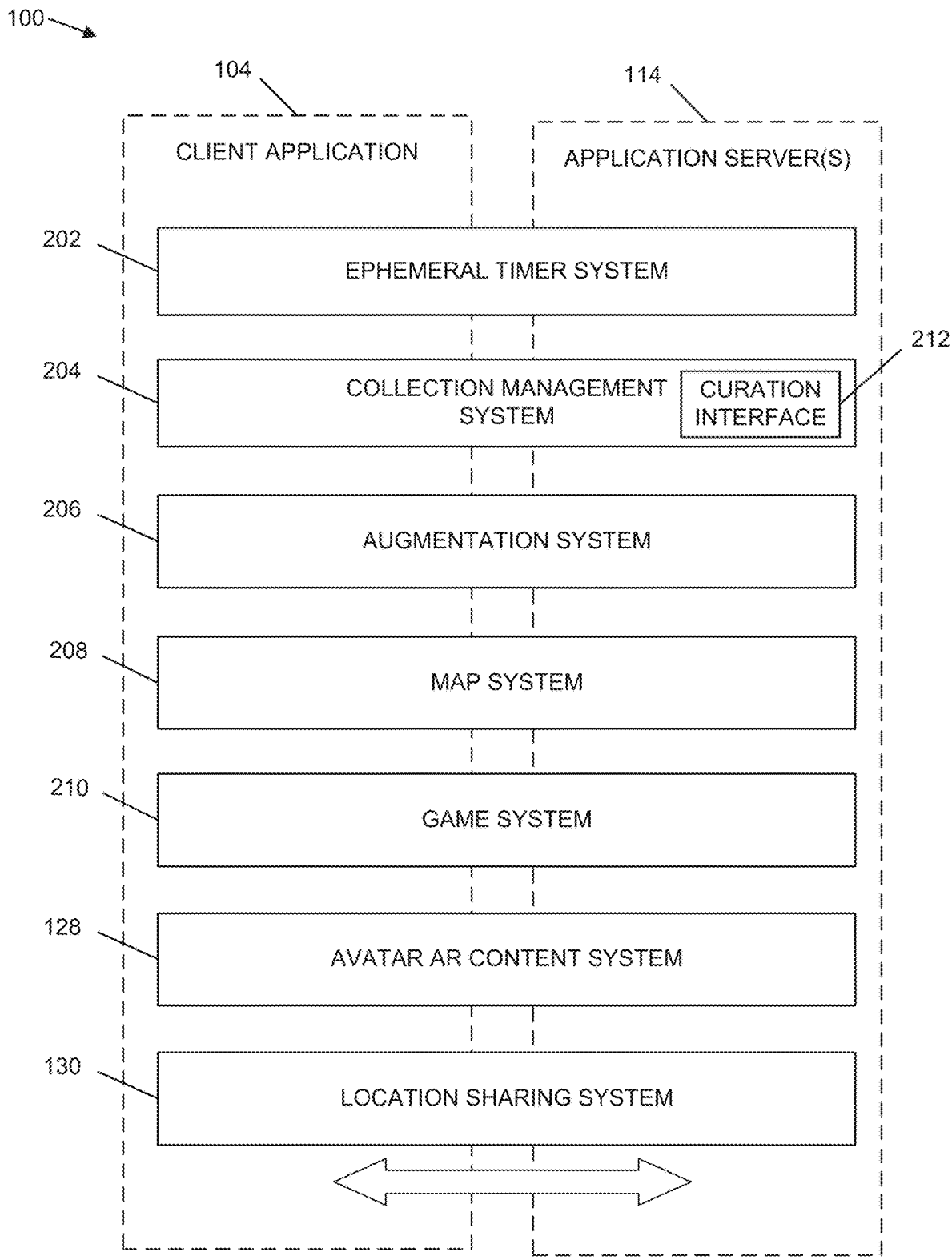
FIG. 2 is a diagrammatic representation of a system, in accordance with some examples, that may have both client-side and server-side functionality.

FIG. 2 is a block diagram illustrating further details regarding the server system 108, according to some examples. Specifically, the server system 108 is shown to comprise the client application 104 and the application servers 114. The server system 108 embodies a number of subsystems, which are supported on the client-side by the client application 104 and on the sever-side by the application servers 114. These subsystems include, for example, an ephemeral timer system 202, a collection management system 204, an augmentation system 206, a map system 208, a game system 210, the avatar AR content system 128, and the location sharing system 130.

The ephemeral timer system 202 is responsible for enforcing the temporary or time-limited access to content by the client application 104 and the messaging application system 122. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with content produced via the client application 104, such as a message. For example, the augmentation system 206 provides functions related to the generation and publishing of media overlays for content processed by the server system 108. The augmentation system 206 operatively, supplies a media overlay or augmentation (e.g., an image filter) to the client application 104 based on a geolocation of the client device 102. In another example, the augmentation system 206 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or an image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database(s) 118 and accessed through the database server(s) 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the client application 104. For example, the map system 208 enables the display of user icons or avatars (e.g., stored in profile data 308 of FIG. 3) on a map to indicate a current or past location of "friends" of a user, as well as media content (e.g., collections of messages including photographs and videos) generated by such friends, within the context of a map. For example, a message posted by a user to the server system 108 from a specific geographic location may be displayed within the context of a map at that particular location to "friends" of a specific user on a map interface of the client application 104. A user can furthermore share his or her location and status information (e.g., using an appropriate status avatar) with other users of the server system 108 via the client application 104, with this location and status information being similarly displayed within the context of a map interface of the client application 104 to selected users.

The game system 210 provides various gaming functions within the context of the client application 104. The client application 104 provides a game interface providing a list of available games that can be launched by a user within the context of the client application 104, and played with other users of the server system 108. The server system 108 further enables a particular user to invite other users to participate in the play of a specific game, by issuing invitations to such other users from the client application 104. The client application 104 also supports both the voice and text messaging (e.g., chats) within the context of gameplay, provides a leaderboard for the games, and also supports the provision of in-game rewards (e.g., coins and items).

The avatar AR content system 128 may generate augmented reality content items that are executable to modify user content that is captured by one or more input devices of client devices 102 of users of the client application 104 and that includes at least one avatar of respective users of the client application 104. In various examples, the modified user content generated by the avatar AR content system 128 may include location information that corresponds to the respective locations of users of the client application 104. In one or more examples, the modified user content may be generated based on selection of an avatar-based location sharing user interface element that is included in a user interface that also includes the user content that is to be modified by avatar-related augmented reality content items. The avatar AR content system 128 may operate in conjunction with the augmentation system 206 to generate the modified user content. For example, the augmentation system 206 may modify user content or cause user content to be modified by adding augmented reality content that includes an avatar of a user of the client application 104 in response to selection of the avatar-based location sharing user interface element.

Additionally, the avatar AR content system 128 may operate in conjunction with the location sharing system 130 to make the locations of users of the client application 104 accessible to additional users of the client application 104. For example, in response to selection of the avatar-based location sharing UI element, the location sharing system 130 may provide information to the client application 104 to indicate the location of users of the client application 104 in a user interface that includes a map having geographic features, landmarks, streets, and so forth. In this way, the one or more additional users of the client application 104 may access the map user interface to determine the location of a user of the client application 104 that selected the avatar-based location sharing user interface element. Further, the location sharing system 130 may make the location of a user of the client application 104 accessible to one or more additional users of the client application 104 by sending a message to the one or more additional users that includes modified user content, where the modified user content includes the avatar of the user of the client application 104 and includes location information related to the location of the user.

Figure 3:
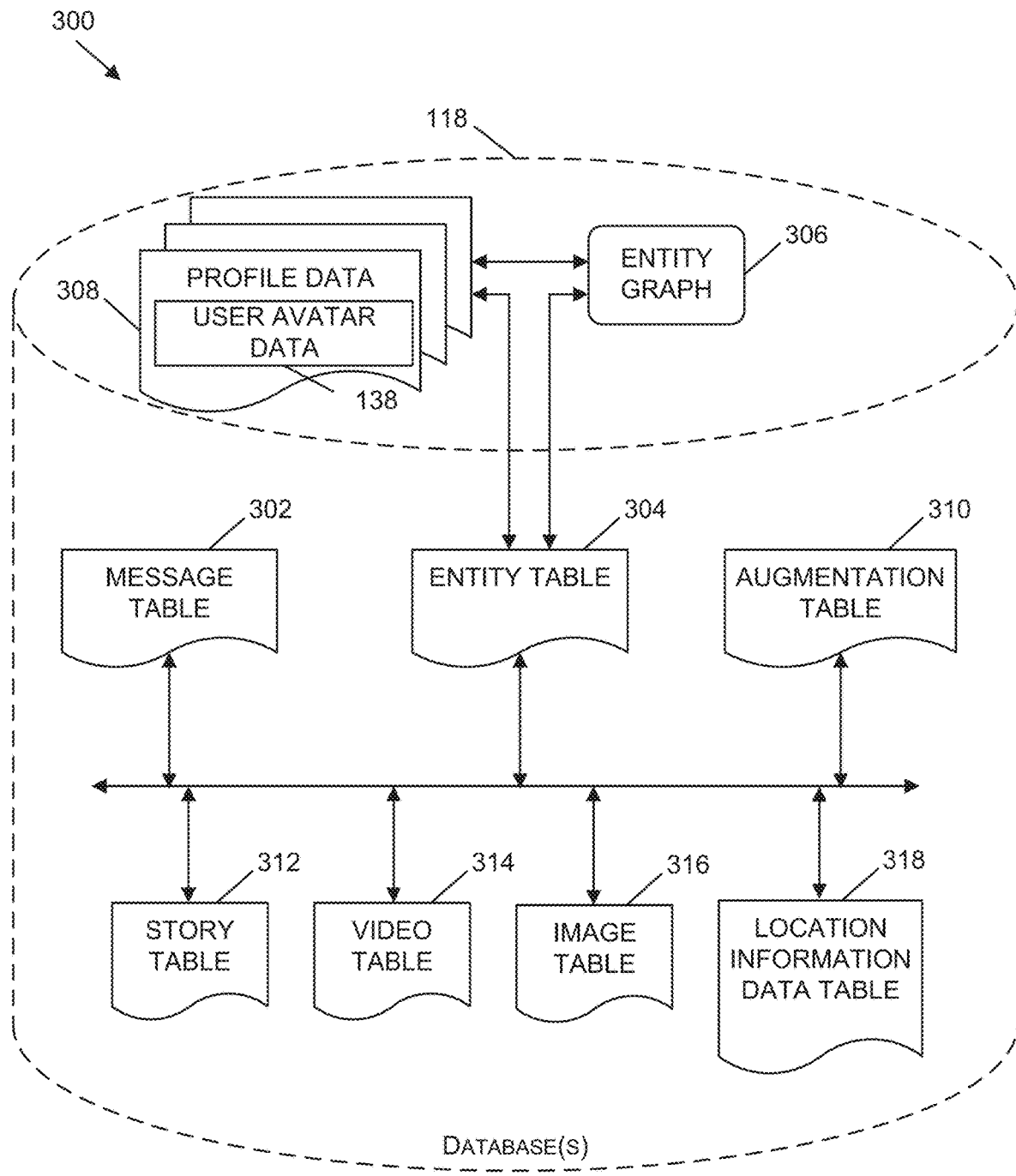
FIG. 3 is a schematic diagram illustrating data that may be stored in a database of a server system, according to one or more example implementations.

FIG. 3 is a schematic diagram illustrating data structures 300 which may be stored in the database(s) 118 of the server system 108, according to one or more example implementations. While the content of the database(s) 118 is shown to comprise a number of tables, it will be appreciated that the data could be stored in other types of data structures (e.g., as an object-oriented database).

The database 118 includes message data stored within a message table 302. This message data includes, for any particular one message, at least message sender data, message recipient (or receiver) data, and a payload.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the architecture 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). Avatars of users of the client application 104 may be stored as user avatar data 138. A particular user may then selectively include one or more of these avatar representations within the content of messages or other data communicated via the architecture 100, and on map interfaces displayed by client application 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 118 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by, different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some implementations, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In various examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In one or more systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

A computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface, in some implementations, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database(s) 118 may also store a location information data table 318. The location information data table 318 may store various types of information about one or more locations. The information stored by the location information data table 318 may include an identifier of the location, text content related to the location, image content related to the location, video content related to the location, audio content related to the location, one or more ratings related to the location, one or more reviews related to the location, one or more avatars related to the location, one or more augmented reality content features related to the location, or one or more combinations thereof. In scenarios where the location corresponds to a business or other entity, the location information data table 318 may store at least one of an identifier of the business or other entity, a logo of the business or entity, or other graphics content of the business or other entity that may be displayed as at least a portion of avatar AR content. In one or more examples, the information for a respective location stored by the location information data table 318 may be stored such that the information may be retrieved based on geographic position data corresponding to the location. For example, geographic position data of a user of the client application 104 may be compared with respect to geographic position data of a location stored by the database(s) 118 to determine whether or not the user of the client application 104 is located at the respective location. To illustrate, the server system 108 may determine that geographic position data of the user of the client application 104 has at least a threshold amount of similarity with the geographic position data of the location to determine that the user of the client application 104 is located at the respective location. Information about the location may then be retrieved from the location information data table 318 to be displayed in relation to an avatar of the user of the client application 104 in response to selection of an avatar-based location sharing user interface element. In one or more additional examples, information corresponding to a location may be retrieved from the location information data table 318 based on an identifier of the location, such as a name of the location or an identifier of the location within the server system 108.

Figure 4:
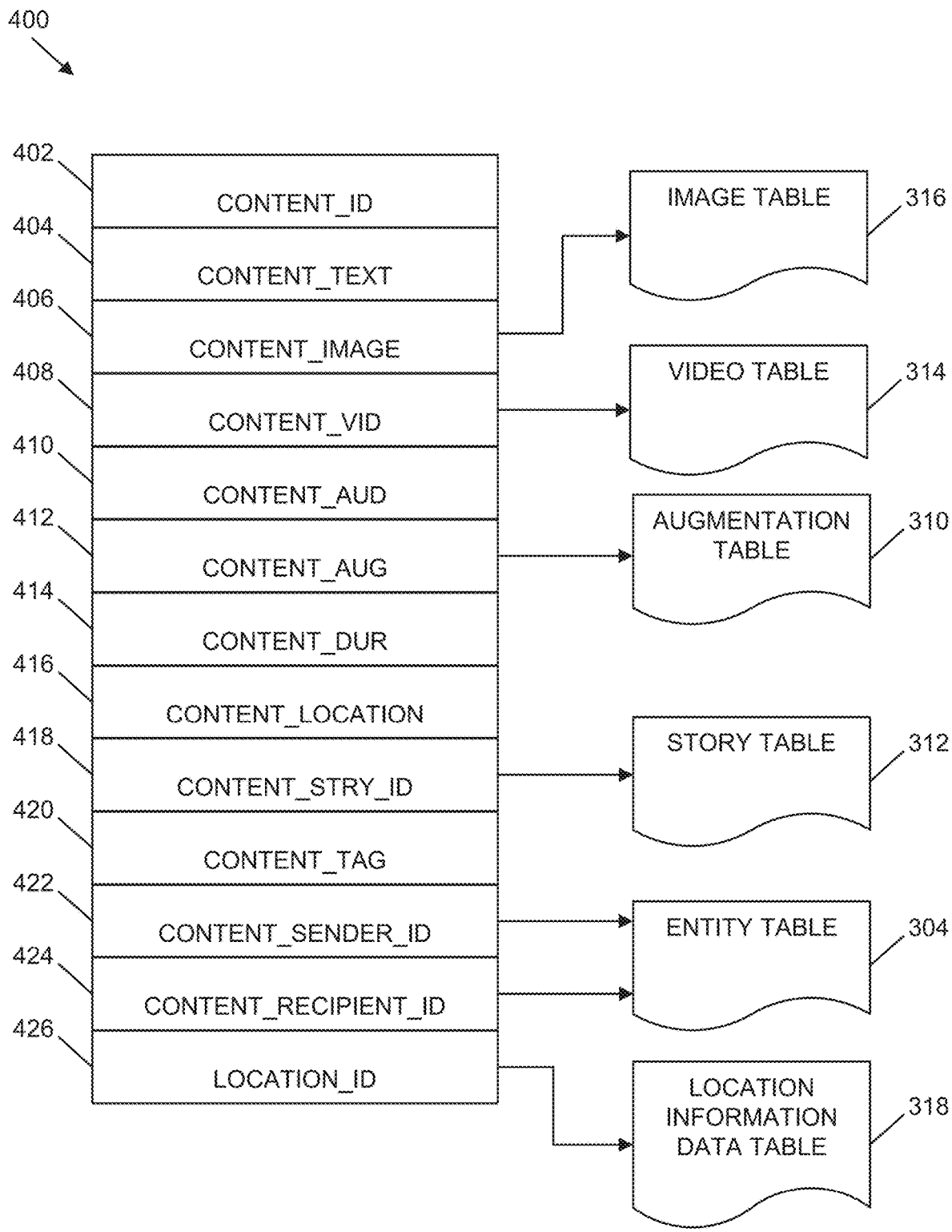
FIG. 4 is a schematic diagram illustrating an example framework for content that may be generated by a client application, in accordance with one or more example implementations.

FIG. 4 is a schematic diagram illustrating an example framework for content 400, according to some implementations. The content 400 may be generated by the client application 104. In various examples, the content 400 may be generated by a first instance of the client application 104 and communicated to at least one of a second instance of the client application 104 or the server system 108. In situations where the content 400 includes a message, the content 400 may be used to populate the message table 302 stored within the database(s) 118 and accessible by the application server 114. In one or more implementations, the content 400 may be stored in memory as "in-transit" or "in-flight" data of at least one of client devices 102 or the application server 114. The content 400 is shown to include at least a portion of the following components:

content identifier 402: a unique identifier that identifies the content 400.

content text payload 404: text, to be generated by a user via a user interface of the client device 102, and that is included in the content 400.

content image payload 406: image data, captured by a camera component of a client device 102 or retrieved from a memory component of a client device 102, and that is included in the content 400. Image data for sent or received content 400 may be stored in the image table 316.

content video payload 408: video data, captured by a camera component or retrieved from a memory component of the client device 102, and that is included in the content 400. Video data for sent or received content 400 may be stored in the video table 314.

content audio payload 410: audio data, captured by a microphone or retrieved from a memory component of the client device 102, and that is included in the content 400.

content augmentation data 412: augmentation data (e.g., filters, stickers, or other annotations or enhancements) that represents augmentations to be applied to content image payload 406, content video payload 408, or content audio payload 410 of the content 400. Augmentation data for a sent or received content 400 may be stored in the augmentation table 310.

content duration parameter 414: parameter value indicating, in seconds, the amount of time for which one or more portions of the content 400 (e.g., the content image payload 406, content video payload 408, content audio payload 410) are to be presented or made accessible to a user via the client application 104.

content geolocation parameter 416: geolocation data (e.g., latitudinal and longitudinal coordinates) associated with the content payload of the message. Multiple content geolocation parameter 416 values may be included in the payload, each of these parameter values being associated with respect to content items included in the content (e.g., a specific image into within the content image payload 406, or a specific video in the content video payload 408).

content story identifier 418: identifier values identifying one or more content collections (e.g., "stories" identified in the story table 312) with which a particular item in the content image payload 406 of the content 400 is associated. For example, multiple images within the content image payload 406 may each be associated with multiple content collections using identifier values.

content tag 420: content 400 may be tagged with multiple tags, each of which is indicative of the subject matter of content included in the content payload. For example, where a particular image included in the content image payload 406 depicts an animal (e.g., a lion), a tag value may be included within the content tag 420 that is indicative of the relevant animal. Tag values may be generated manually, based on user input, or may be automatically generated using, for example, image recognition.

content sender identifier 422: an identifier (e.g., a messaging system identifier, email address, or device identifier) indicative of a user of the client device 102 on which the content 400 was generated and from which the content 400 was sent.

content receiver identifier 424: an identifier (e.g., a messaging system identifier, email address, or device identifier) indicative of a user of the client device 102 to which the content 400 is addressed.

location identifier 426: an identifier of a location of a user of the client application 104. The location identifier 426 may include geographic position data of the location of the user. In one or more additional examples, the location identifier 426 may include an identifier of the location of the user, such as a name of a business, a name of an educational entity, a name of a governmental entity, a name of a building, a name of a geological feature, an address, one or more street names, a name of a geographic region, or one or more combinations thereof, and so forth. In various examples, the location identifier 426 may correspond to a location that is related to the content 400. For example, the location identifier 426 may correspond to a location of the user of the client application 104 where the content 400 was captured.

The data (e.g., values) of the various components of content 400 may correspond to pointers to locations in tables within which the data is stored. For example, an image value in the content image payload 406 may be a pointer to (or address of) a location within an image table 316. Similarly, values within the content video payload 408 may point to data stored within a video table 314, values stored within the content augmentations 412 may point to data stored in an augmentation table 310, values stored within the content story identifier 418 may point to data stored in a story table 312, and values stored within the content sender identifier 422 and the content recipient identifier 424 may point to user records stored within an entity table 304. Further, values of the location identifier(s) 426 may point to data stored within a data structure that includes the location information data table 318. The location identifier 426 may be used to retrieve information corresponding to the location of the user that is stored in the location information data table 318.

Figure 5:
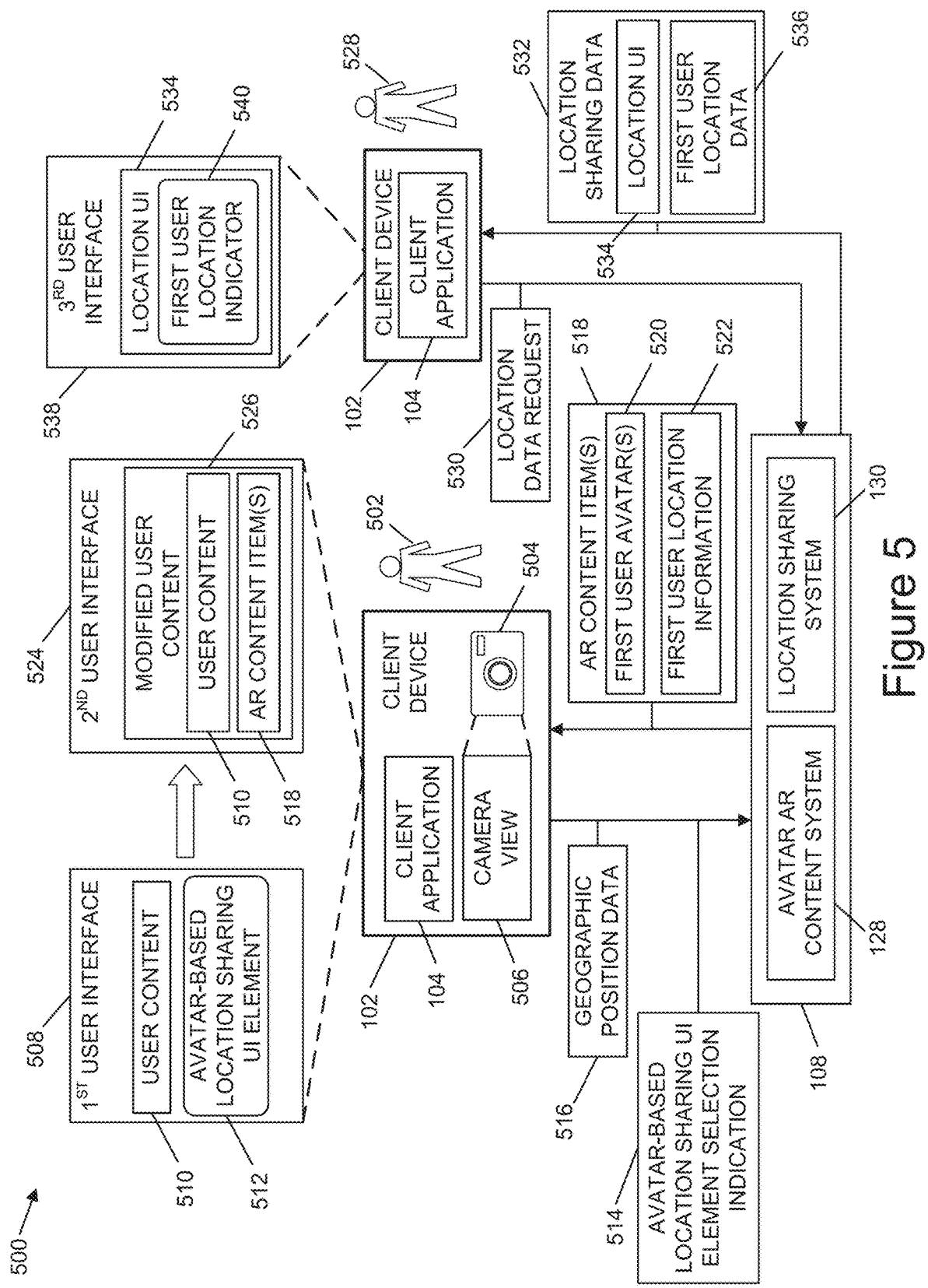
FIG. 5 is a diagrammatic representation illustrating an architecture to generate augmented reality content that includes an avatar of a user of a client application and shares a location of the user, in accordance with one or more example implementations.

FIG. 5 is a diagrammatic representation illustrating an architecture 500 to generate augmented reality content that includes an avatar of a user of a client application and shares a location of the user, in accordance with one or more example implementations. The architecture 500 may include a client device 102 that is operated by a first user 502. The client device 102 may store and execute an instance of the client application 104. The client device 102 may also include one or more cameras, such as the camera 504. The camera 504 may capture at least one of image content or video content. The client device 102 may also include one or more input devices that capture audio content that may correspond to video content captured by the camera 504. The camera 504 may capture a camera view 506 that may include a live view of content being captured by the camera 504.

The client application 104 may cause a number of user interfaces to be displayed via one or more display devices of the client device 102. For example, the client application 104 may cause a first user interface 508 to be displayed. The first user interface 508 may include user content 510. The user content 510 may include at least one of image content or video content captured via the camera 504. In one or more examples, the user content 510 may include the camera view 506. In one or more additional examples, the user content 510 may include content previously captured by the camera 504. In various examples, at least a portion of the user content 510 may be stored by memory of the client device 102. In one or more further examples, at least a portion of the user content 510 may be stored in one or more data storage devices that are located remotely with respect to the client device 102 and accessible to the client device 102.

The first user interface 508 may also include an avatar-based location sharing user interface (UI) element 512. The avatar-based location sharing UI element 512 may be selectable to modify the user content 510 by executing one or more augmented reality content items. The one or more augmented reality content items may be executable to display one or more avatars of the first user 502 in relation to the user content 510. Additionally, selection of the avatar-based location sharing UI element 512 may cause one or more augmented reality content items to be executed to display information related to the location of the first user 502 with respect to the user content 510. Further, the avatar-based location sharing UI element 512 may be selectable to make a location of the first user 502 accessible to one or more additional users of the client application 104. In various examples, the avatar-based location sharing element 512 may be one user interface element of a plurality of user interface elements displayed in the first user interface 508 that are individually selectable to execute respective augmented reality content items. For example, the plurality of user interface elements that are each selectable to execute one or more augmented reality content items may be displayed in a carousel user interface that may enable users of the client application 104 to cycle through a number of different augmented reality content item user interface elements at a given time.

In response to selection of the avatar-based location sharing UI element 512, the client application 104 may send information to the server system 108. For example, the client application 104 may send an avatar-based location sharing UI element selection indication 514 to the server system 108 based on input received by the client device 102 corresponding to selection of the avatar-based location sharing UI element 512. The client application 104 may also send geographic position data 516 to the server system 108 in response to selection of the avatar-based location sharing UI element 512. The geographic position data 516 may indicate a location of the first user 502. To illustrate, the geographic position data 516 may include GPS data that may be used to determine the location of the first user 502. Additionally, the geographic position data 516 may include an identifier of the location of the first user 502. In various examples, the identifier of the location of the first user 502 may be determined by the client application 104 based on information included in at least one of message content or a social networking post that is related to the user content 510. In one or more further examples, the geographic position data 516 may include at least a portion of the user content 510. In these scenarios, the server system 108 may analyze the user content 510 to determine a location of the first user 502 based on at least one of one or more objects included in the user content 510, one or more landmarks included in the user content 510, or text content included in the user content 510.

Based on receiving the avatar-based location sharing UI element selection indication 514, the avatar AR content system 128 may determine one or more avatars of the first user 502 that may be used to modify the user content 510. In one or more examples, the avatar-based location sharing UI element 512 may correspond to at least one avatar of the first user 502. In various examples, the avatar AR content system 128 may receive input from the client device 102 indicating one or more avatars to associate with the avatar-based location sharing UI element 512. In this way, the avatar-based location sharing UI element 512 may be associated with at least one pre-selected avatar of the first user 502. In one or more additional examples, the avatar AR content system 128 may analyze profile data of the first user 502 to determine at least one avatar of the first user 502 that may be used to modify the user content 510. In one or more implementations, the profile data of the first user 502 may indicate at least one avatar that is associated with a respective location of the first user 502 or indicate at least one avatar that corresponds to the avatar-based location sharing UI element 512.

Additionally, the avatar AR content system 128 may determine location information related to the location of the first user 502 based on the geographic position data 516 and in response to the avatar-based location sharing UI element selection indication 514. The location information may be displayed in conjunction with at least one avatar of the first user 502 in relation to the user content 510. The avatar AR content system 128 may determine the location of the first user 502 by analyzing the geographic position data 516 with respect to additional information related to a location. For example, the avatar AR system 128 may access additional geographic position data of a number of locations and analyze the additional geographic position data with respect to the geographic position data 516. The avatar AR system 128 may determine that additional geographic position data of a given location may have at least a threshold measure of similarity with respect to the geographic position data 516. In these scenarios, the avatar AR system 128 may determine that the given location corresponds to the location of the first user 502.

Further, the avatar AR content system 128 may analyze at least a portion of the user content 510 to determine a location of the first user 502. To illustrate, the avatar AR system 128 may implement one or more object recognition techniques to identify location identification information included in the user content 510 that includes at least one of one or more objects included in the user content 510, one or more buildings included in the user content 510, one or more landmarks included in the 510, one or more arrangements of objects included in the user content 510, one or more arrangements of buildings included in the user content 510, one or more geological features included in the user content 510, or text content included in the user content 510. The avatar AR system 128 may analyze the location identification information related to the user content 510 with respect to additional location information of a number of locations that is accessible to the avatar AR system 128. The additional location information may include data corresponding to at least one of one or more objects related to one or more locations, one or more buildings related to one or more locations, one or more landmarks related to one or more locations, one or more arrangements of objects related to one or more locations, one or more arrangements of buildings related to one or more locations, one or more geological features related to one or more locations, or text content related to one or more locations.

In one or more illustrative examples, the avatar AR content system 128 may analyze the location identification information related to the user content 510 with respect to the additional location information to determine a measure of similarity between the location identification information related to the user content 510 with respect to the additional location information of one or more locations. In various examples, the avatar AR content system 128 may compare the location identification information related to the user content 510 with respect to the additional location information to determine a measure of similarity between the location identification information related to the user content 510 with respect to the additional location information of one or more locations. The avatar AR content system 128 may determine a location of the first user 502 based on the measure of similarity between the location identification information related to the user content 510 and additional information of a given location being at least a threshold measure of similarity.

The avatar AR content system 128 may also analyze text content related to the user content 510 to determine an identifier of a location of the first user 502. For example, the avatar AR content system 128 may analyze at least one of message content, annotation content, or social networking content to identify an identifier of a location. In one or more illustrative examples, an identifier of a location may be indicated by one or more symbols, such as a hashtag or "#". In various examples, the avatar AR content system 128 may analyze text content related to the user content 510 to identify a name of a business, a name of another entity, a name of a building, a name of a landmark, one or more street names, one or more landmark names, one or more city names, one or more state names, one or more country names, one or more province names, one or more county names, one or more names of other geopolitical regions, one or more names of geographical regions, or one or more combinations thereof. The avatar AR content system 128 may determine the location of the first user 502 based on one or more identifiers of a location included in text content related to the user content 510 having at least a threshold measure of similarity with respect to one or more predetermined location identifiers that are accessible to the avatar AR content system 128.

The avatar AR content system 128 may generate one or more augmented reality (AR) content items 518 and send the one or more AR content items 518 to the client device 102. The one or more AR content items 518 may include one or more first user avatars 520 and first user location informant 522. The one or more first user avatars 520 may include one or more representations of the first user 502 within the client application 104. The one or more first user avatars 520 may be customized to resemble the first user 502. In one or more examples, the one or more first user avatars 520 may be related to the location of the first user 502. For example, the one or more first user avatars 520 may include one or more features that correspond to the location of the first user 502. To illustrate, the one or more first user avatars 520 may include at least one of one or more poses, one or more facial expressions, one or more actions, one or more articles of clothing, one or more accessories, or one or more objects related to the location of the first user 502. In one or more examples, the one or more first user avatars 520 may include at least one avatar, at least one feature, at least one pose, at least one accessory, at least one article of clothing, or at least one object provided by an entity associated with the location of the first user 502. In one or more illustrative examples, the location of the first user 502 may be a restaurant and the one or more first user avatars 520 may include an avatar of the first user 502 eating a dish served at the restaurant. In one or more additional illustrative examples, the first user 502 may be located at a sporting event and an avatar of the first user 502 may include a shirt having a name of a sports team that is associated with the sporting event.

The one or more AR content items 518 may also include first user location information 522. The first user location information 522 may include at least one of one or more identifiers corresponding to the location of the first user 502, text content corresponding to the location of the first user 502, or one or more objects corresponding to the location of the first user 502. In response to determining the location of the first user 502, the avatar AR content system 128 may parse a database for information related to the location of the first user 502. The avatar AR content system 128 may retrieve the information related to the location of the first user 502 and include the retrieved information as the first user location information 522. Continuing with the illustrative examples from above, in situations where the first user 502 is located at a restaurant, the first user location information 522 may include at least one of a name of the restaurant or a logo of the restaurant. Additionally, in situations where the first user 502 is located at a sporting event, such as a basketball game, the first user location information 522 may include a basketball, an animation of a bouncing basketball, text content including a name of a sports venue, a name of a team participating in the sporting event, a motivational expression, a slogan, or one or more combinations thereof related to the location of the first user 502.

The client application 104 may generate a second user interface 524 based on the one or more AR content items 518 obtained from the server system 108. The second user interface 524 may include modified user content 526. The modified user content 526 may include the user content 510 and AR content corresponding to the one or more AR content items 518. The modified user content 526 may be generated by executing the one or more AR content items 518 with respect to the user content 510. For example, the one or more AR content items 518 may be executed to apply one or more visual effects with respect to the user content 510. To illustrate, the one or more AR content items 518 may be executed to display the one or more first user avatars 520 within the user content 510. In various examples, the one or more first user avatars 520 may be displayed as an overlay of the user content 510. Additionally, the one or more AR content items 518 may be executed to display the first user location information 522 within the user content 510. In one or more examples, the first user location information 522 may be displayed as an overlay with respect to the user content 510.

In one or more implementations, the modified user content 526 may be accessible to other users of the client application 104. For example, the first user 502 may share the modified user content 526 with additional users of the client application 104 via social networking functionality of the client application 104. To illustrate, one or more social networking posts may be generated in response to input from the first user 502, where the one or more social networking posts include the modified user content 526.

Additionally, one or more messages including the modified user content 526 may be communicated by the first user 502 with one or more additional users of the client application 104. In one or more examples, the modified user content 526 may be further modified using one or more creative tools of the client application 104. The one or more creative tools may include at least one of one or more drawing tools, one or more tools to apply additional text content, one or more tools to apply one or more additional overlays to the modified user content 526, one or more tools to add one or more objects to the modified user content 526, one or more took to apply one or more animations to the modified user content 526, one or more tools to add one or more additional avatars to the modified user content 526, or one or more took to apply one or more additional visual effects to the modified user content 526.

In various examples, in response to obtaining the avatar-based location sharing UI element selection indication 514, the location sharing system 130 may make the location of the first user 502 accessible to one or more additional users of the client application 104. In one or more examples, the server system 108 may send location information of the first user 502 to the one or more additional users. For example, the server system 108 may send one or more messages via the client application 104 indicating the location of the first user 502 to client devices 102 of the one or more additional users of the client application 104. In one or more additional examples, the location sharing system 130 may make the location of the first user 502 available to one or more additional users of the client application 104 via a location user interface of the client application 104.

In one or more implementations, the architecture 500 may include a second user 528 that operates an additional client device 102 that executes an additional instance of the client application 104. In these scenarios, a location data request 530 may be sent from the additional client device 102 to the server system 108. In response to the location data request 530, the location sharing system 130 may send location sharing data 532 to the additional client device 102 of the second user 528. The location sharing data 532 may, include user interface data that corresponds to a location user interface (UI) 534. The location UI 534 may include one or more locations. In one or more illustrative examples, the location UI 534 may include a map user interface. The map user interface may include a number of features within a geographic location. For example, the map user interface may include a grid showing transportation thoroughfares of a geographic location, such as streets, highways, expressways, and the like. The map user interface may also indicate buildings, landmarks, and/or other structures within a geographic location. Further, the map user interface may indicate one or more geological features within a geographic location. In addition, the map user interface may indicate a respective location of one or more additional users of the client application 104. To illustrate, the map user interface may indicate the location of one or more users of the client application 104 by displaying an avatar of the one or more users in relation to a geographic location of the one or more users.

In various examples, in response to the location request 530, the location sharing system 130 may determine a location of one or more additional users of the client application 104 that have provided permission for the second user 528 to access the respective locations of the one or more additional users. In one or more illustrative examples, the first user 502 may have provided permission for the second user 528 to access the location of the first user 502. In these scenarios, in response to receiving the location request 530, the location sharing system 130 may determine the location of the first user 502 based on information determined by the avatar AR content system 128 in response to selection of the avatar-based location sharing UI element 512 by the first user 502. For example, the avatar AR content system 128 may determine that the first user 502 is located at a given restaurant in response to selection of the avatar-based location sharing UI element 512. The location sharing system 130 may then generate first user location data 536 that indicates the location of the first user 502 and that is included in the location sharing data 532. Continuing with the previous examples, the location sharing system 130 may generate the location UI 534 to indicate that the first user 502 is located at the restaurant or the that first user 502 is located at a sports venue.

The additional client device 102 of the second user 528 may generate a third user interface 538 based on the location sharing data 532. The third user interface 538 may include the location UI 534 and a first user location indicator 540. The first user location indicator 540 may include an avatar of the first user 502. In one or more examples, the avatar of the first user 502 displayed in the third user interface 538 may be different from the one or more first user avatars 520. In one or more additional examples, the avatar of the first user 502 displayed in the third user interface 538 may correspond to an avatar included in the one or more first user avatars 520. Continuing with the previous example where the first user 502 is located in a restaurant, the third user interface 538 may include an avatar of the first user 502 displayed at a location that corresponds to the restaurant. In various examples, the third user interface 538 may include one or more additional user location indicators of one or more additional users of the client application 104 that have provided permission for access of the location of the one or more additional users by the second user 528.

By providing the avatar-based location sharing UI element 512, the architecture 500 may provide a user interface element that may be selectable to both execute augmented reality content items that indicate a location of a user of the client application 104 and also share the location of the user with one or more additional users of the client application 104. In various examples, one or more avatars of a user of the client application 104 may also be applied in multiple contexts in response to selection of the avatar-based location sharing UI element 512. For example, an avatar of a user of the client application 104 may be applied in response to execution of an augmented reality content item to user content captured via the client application 104. The avatar of the user of the client application 104 may also be used to indicate the location of the user within a location user interface. Accordingly, the features of the architecture 500 may more efficiently implement functionality of the client application 104 by combining user content creation features with location sharing features than existing systems where content creation functionality and location sharing functionality are separated. Additionally, the architecture 500 may minimize the use of computing resources utilized to implement user content creation features and location sharing features. Further, the location of a user of the client application 104 may be shared using one or more channels, such as via a location user interface and/or via one or more messages accessible to one or more additional users of the client application 104. In this way, the architecture 500 provides flexibility in sharing a location of a user of the client application 104.

Figure 6:
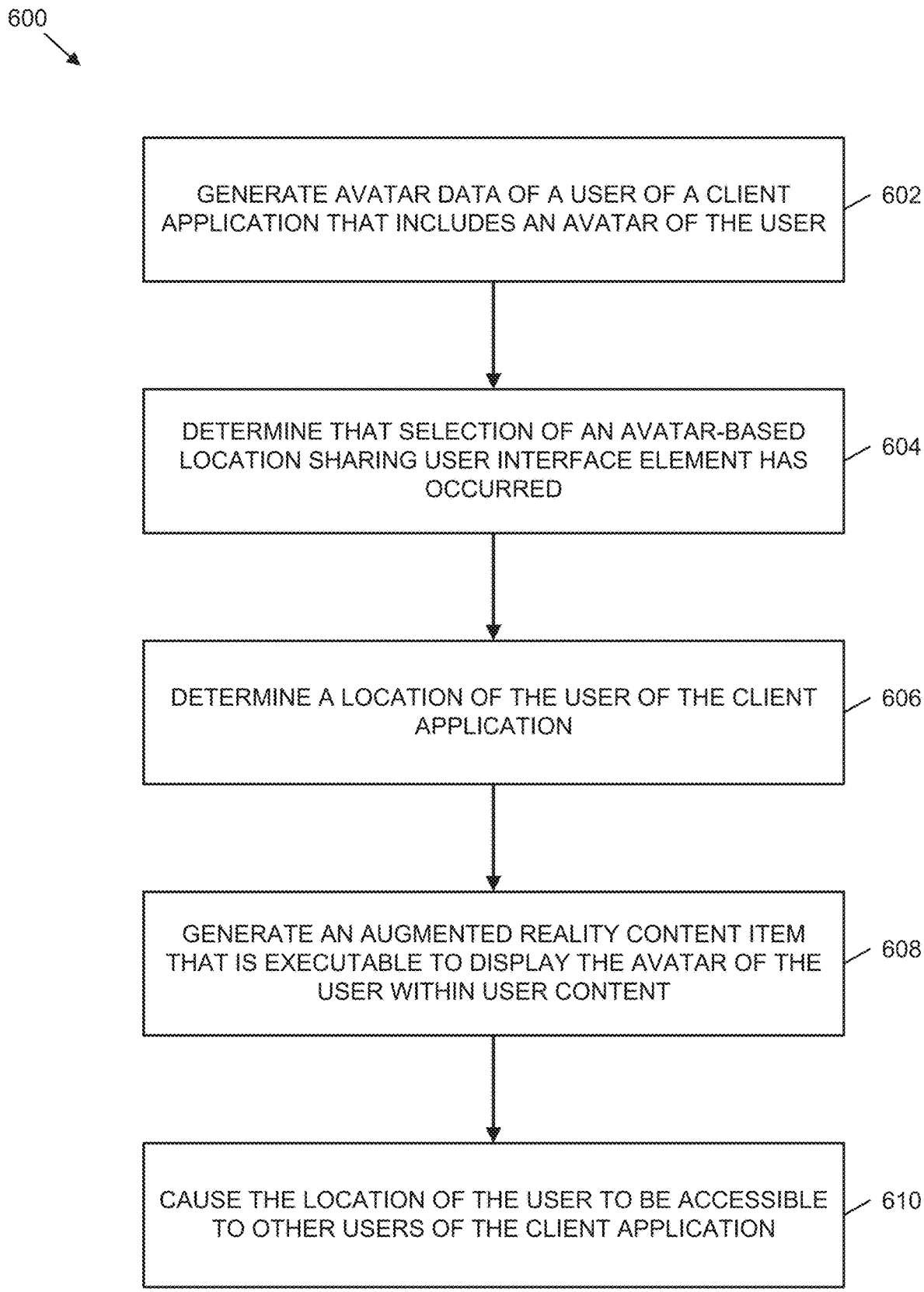
FIG. 6 is a flowchart illustrating example operations of a process to generate augmented reality content that displays an avatar of a user of a client application and information about a location of the user, according to one or more example implementations.
Figure 7:
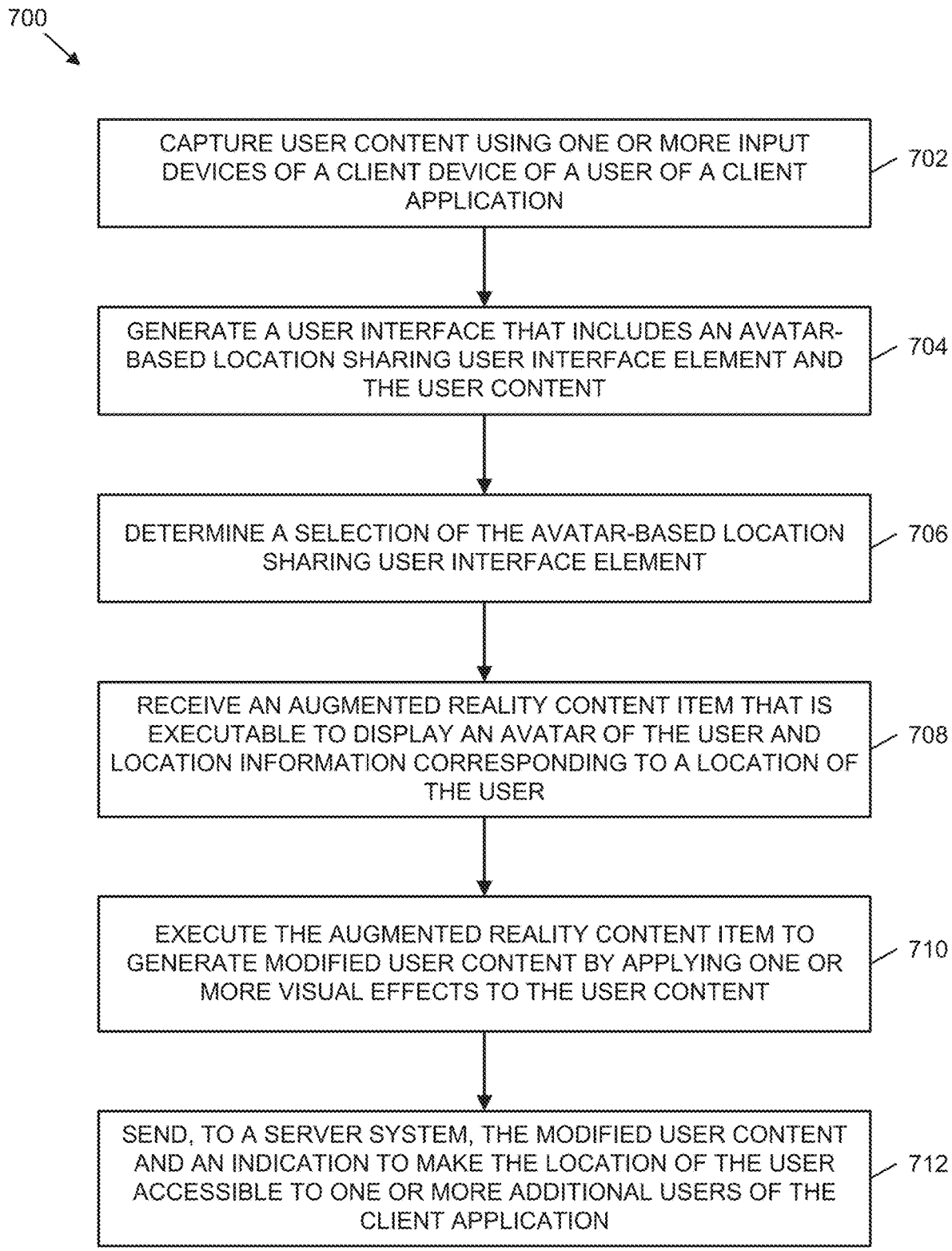
FIG. 7 is a flowchart illustrating example operations of a process to share a location of a user of a client application using augmented reality content that includes an avatar of the user, according to one or more example implementations.

FIGS. 6 and 7 illustrate flowcharts of processes to generate and apply augmented reality content to share a location of a user of the client application 104 with other users of the client application 104. The processes may be embodied in computer-readable instructions for execution by one or more processors such that the operations of the processes may be performed in part or in whole by the functional components of at least one of the client application 104 or the server system 108. Accordingly, the processes described below are by way of example with reference thereto, in some situations. However, in other implementations, at least some of the operations of the processes described with respect to FIGS. 6 and 7 may be deployed on various other hardware configurations. The processes described with respect to FIGS. 6 and 7 are therefore not intended to be limited to the server system 108 or client device 102 and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flowchart illustrating example operations of a process 600 to generate augmented reality content that displays an avatar of a user of client application and information about a location of the user, according to one or more example implementations. At operation 602, the process 600 may include generating avatar data of a user of a client application, where the avatar data includes an avatar of the user. The avatar of the user may be a representation of the user in the client application. For example, the avatar of the user may represent the user in at least one of messages generated using the client application or social networking posts generated using the client application. In one or more additional examples, at least a portion of the avatar of the user may correspond to a profile image of the user. In various examples, the avatar of the user may be generated based on one or more images of the user. In various examples, the avatar of the user may be customized by applying at least one of one or more poses, one or more facial expressions, one or more hair styles, one or more articles of clothing, one or more accessories, one or more objects, or text content to the avatar of the user. In one or more further examples, the avatar of the user may be one of a plurality of avatars of the user. In one or more illustrative examples, the avatar of the user may correspond to a respective location of the user. The avatar data may be stored in relation to a profile of the user with respect to the client application.

In addition, the process 600 may include, at operation 604, determining that selection of an avatar-based location sharing user interface element has taken place. Selection of the avatar-based location sharing user interface element may be determined based on input data received from a client device of a user of the client application. The avatar-based location sharing user interface element may be selectable to execute one or more augmented reality content items related to the avatar-based location sharing user interface element. In one or more examples, the avatar-based location sharing user interface element may be displayed in a user interface that includes a plurality of user interface elements that are selectable to execute one or more augmented reality content items. Augmented reality content items may be executable to apply one or more visual effects with respect to user content. In various examples, the plurality of user interface elements that individually correspond to one or more augmented reality content items may be included in a carousel user interface that enables users of the client application to display multiple user interface elements at a time and to horizontally scroll through a number of user interface elements that individually correspond to one or more augmented reality content items.

User content may be displayed in a user interface of the client application in addition to the avatar-based location sharing user interface element. For example, the user content may include at least one of image content, video content, audio content, or text content. In various examples, the user content may be captured by one or more input devices of a client device executing an instance of the client application. In one or more illustrative examples, the user content may include a live view captured by at least one camera of the client device.

Further, at operation 606, the process 600 may include determining a location of the user of the client application. In one or more scenarios, the location of the user may correspond to a current location of the user. The location of the user may be determined based on geographic position data obtained from a client device of the user. In one or more additional examples, the location of the user may be determined based on geographic position data obtained from one or more network devices. In various examples, the one or more network devices may be included in a wide area wireless communications network. In one or more additional examples, the one or more network devices may be included in at least one of a wireless local area network or a wired local area network. In one or more illustrative examples, the location of the user of the client application may be determined based on GPS data obtained from a client device of the user.

The location of the user may also be determined by analyzing at least one of image content, text content, one or more objects, one or more contours, or one or more combinations thereof of the user content with respect to at least one of image content or video content of a number of locations. That is, the user content may be analyzed with respect to at least one of one or more images or one or more videos of a location. A measure of similarity between features of the user content and features of at least one of images or videos of a number of locations may be determined. In these scenarios, the location of the user may be determined based on a measure of similarity between features of the user content and features of at least one of images or videos of the location being at least a threshold measure of similarity. In one or more illustrative examples, at least one of one or more object recognition techniques or one or more image analysis techniques may be implemented to determine a measure of similarity between features of the user content and features of at least one of images or videos of a number of locations.

The process 600 may also include, at operation 608, generating augmented reality content that is executable to display the avatar of the user within user content. The augmented reality content may include the avatar of the user and the augmented reality content may also include location information that corresponds to the location of the user. In one or more examples, based on determining that selection of the avatar-based location sharing user interface element has taken place, an avatar of the user may be identified to include in the augmented reality content. In various examples, the avatar may be identified based on user input indicating that the avatar corresponds to the avatar-based location sharing user interface element. In one or more implementations, the user may be associated with a number of different avatar-based location sharing user interface elements with each avatar-based location sharing user interface element being associated with a different avatar of the user. In one or more illustrative examples, one or more avatars of the user may be associated with respective locations. In one or more scenarios, the avatar-based location sharing user interface element displayed in a user interface may correspond to the location of the user such that one or more avatar-based location sharing user interface elements displayed at a given time may be based on the geographic position of the user. The avatar of the user that is determined based on selection of the avatar-based location sharing user interface element may be retrieved from a profile of the user with respect to the client application and added to augmented reality content data that is sent to the client device.

The augmented reality content item may be executable to modify user content by applying one or more visual effects to the user content. In various examples, the one or more visual effects may be applied to one or more objects included in the user content. In one or more examples, one or more augmented reality content items may be executable to display the avatar of the user and the location information within the user content. In one or more examples, the avatar of the user and the location information may be displayed as one or more overlays of user content.

In one or more implementations, location information that corresponds to one or more augmented reality content items may be obtained via a portal provided by a service provider that implements functionality related to the client application. The portal may include one or more user interfaces that capture information that may be related to a location. In various examples, the one or more user interfaces of the portal may include one or more templates that enable a representative of an entity associated with a location to provide information related to the location. For example, the one or more templates may include one or more user interface elements to capture location information, such as image content related to the location, video content related to the location, audio content related to the location, text content related to the location, graphical content related to the location, one or more avatars related to the location, or features of avatars related to the location (e.g., accessories, articles of clothing, poses, facial expressions, and so forth).

At operation 610, the process 600 may include causing the location of the user to be accessible to other users of the client application. The location of the user may be accessible to one or more additional users of the client application via one or more messages sent to the one or more additional users via the client application. For example, a message may be generated based on input from the user of the client application where the message includes user content, the avatar of the user, and location information that corresponds to the location of the user. The location of the user may also be accessible to one or more additional users of the client application via a user interface that includes a map. To illustrate, the client application may include a map user interface that indicates geographic positions of at least one of locations or users of the client application. The respective geographic positions of at least one of users of the client application or one or more locations may be indicated in the map user interface by avatars or other graphical content.

In one or more implementations, the user of the client application may provide permission for one or more additional users of the client application to access the location of the user of the client application. In these scenarios, one or more additional users of the client application accessing the location of the user may include displaying the avatar of the user when the one or more additional users of the client application access the map user interface. In various examples, one or more client devices of the one or more additional users of the client application may send respective location requests to a server system with respect to the user of the client application such that the location of the user may be displayed in the map user interface when the map user interface is accessed by the one or more additional users via the client application. In one or more additional examples, the location of the user may be displayed in relation to a status indicator within the client application. In one or more further examples, a server system that implements functionality of the client application may receive a request from an additional user of the client application to identify the location of the user of the client application. In these instances, the server system may send one or more identifiers of the location of the user of the client application to the additional user of the client application.

FIG. 7 is a flowchart illustrating example operations of a process 700 to share a location of a user of a client application that executes augmented reality content items that display an avatar of the user, according to one or more example implementations. At operation 702, the process 700 may include capturing user content using one or more input devices of a client device of a user of a client application. In one or more examples, the user content may be captured using at least one of one or more cameras or one or more microphones of the client device. In various examples, the user content may include a live view from at least one camera of the client device.

The process 700 may also include, at operation 704, generating a user interface that includes an avatar-based location sharing user interface element and the user content. The user interface may be displayed via the client application. In one or more examples, the avatar-based location sharing user interface element may be one of a number of user interface elements shown in the display that are each selectable to cause at least one augmented reality content item to be executed. In addition, the process 700 may include, at operation 706, determining a selection of the avatar-based location sharing user interface element. Selection of the avatar-based location sharing user interface element may be detected by one or more input devices of the client device. In various examples, selection of the avatar-based location sharing user interface element may be detected by at least one of a touchscreen of the client device, one or more cameras of the client device, or one or more microphones of the client device.

Further, at operation 708, the process 700 may include receiving an augmented reality content item that is executable to display an avatar of the user and location information corresponding to a location of the user. The augmented reality content may be received by the client device from a server system. In one or more examples, the augmented reality content item may be received from the server system in response to the selection of the avatar-based location sharing user interface element. To illustrate, in response to selection of the avatar-based location sharing user interface element, the client device may send a request to the server system to provide augmented reality content item related to the location of the user. In one or more additional examples, the augmented reality content item may already be stored in memory of the client device of the user, such as long-term storage, short term memory, cache memory, and the like.

At operation 710, the process 700 may include executing the augmented reality content to generate modified user content by applying one or more visual effects to the user content. In one or more illustrative examples, the modified user content may include displaying an avatar of the user and information related to the location of the user within the user content. For example, the augmented reality content item may be executable to display an avatar of the user as an overlay of user content and an identifier of the location of the user as an overlay of the user content. In one or more implementations, the modified user content may be further modified by one or more creative tools of the client application. The one or more creative tools may be implemented to apply one or more additional visual effects to the modified user content. In various examples, the one or more creative tools may be implemented to apply text content, image content, animation content, video content, audio content, or one or more combinations thereof, to the modified user content. In one or more additional examples, the one or more creative tools may include at least one of one or more drawing tools or one or more painting tools that may be implemented to further modify the modified user content.

Additionally, at operation 712, the process 700 includes sending, to a server system, the modified user content and an indication to make the location of the user accessible to one or more additional users of the client application. In one or more examples, the modified user content or further modified user content may be included in a message that shares the location with one or more additional users of the client application. In one or more additional examples, the location of the user may be accessible via a map user interface of the client application that indicates locations of one or more users of the client application within a geographic region. The map user interface may also indicate landmarks, roads, buildings, geological features, businesses, locations of additional entities, or one or more combinations thereof, within a geographic region.

Figure 8:
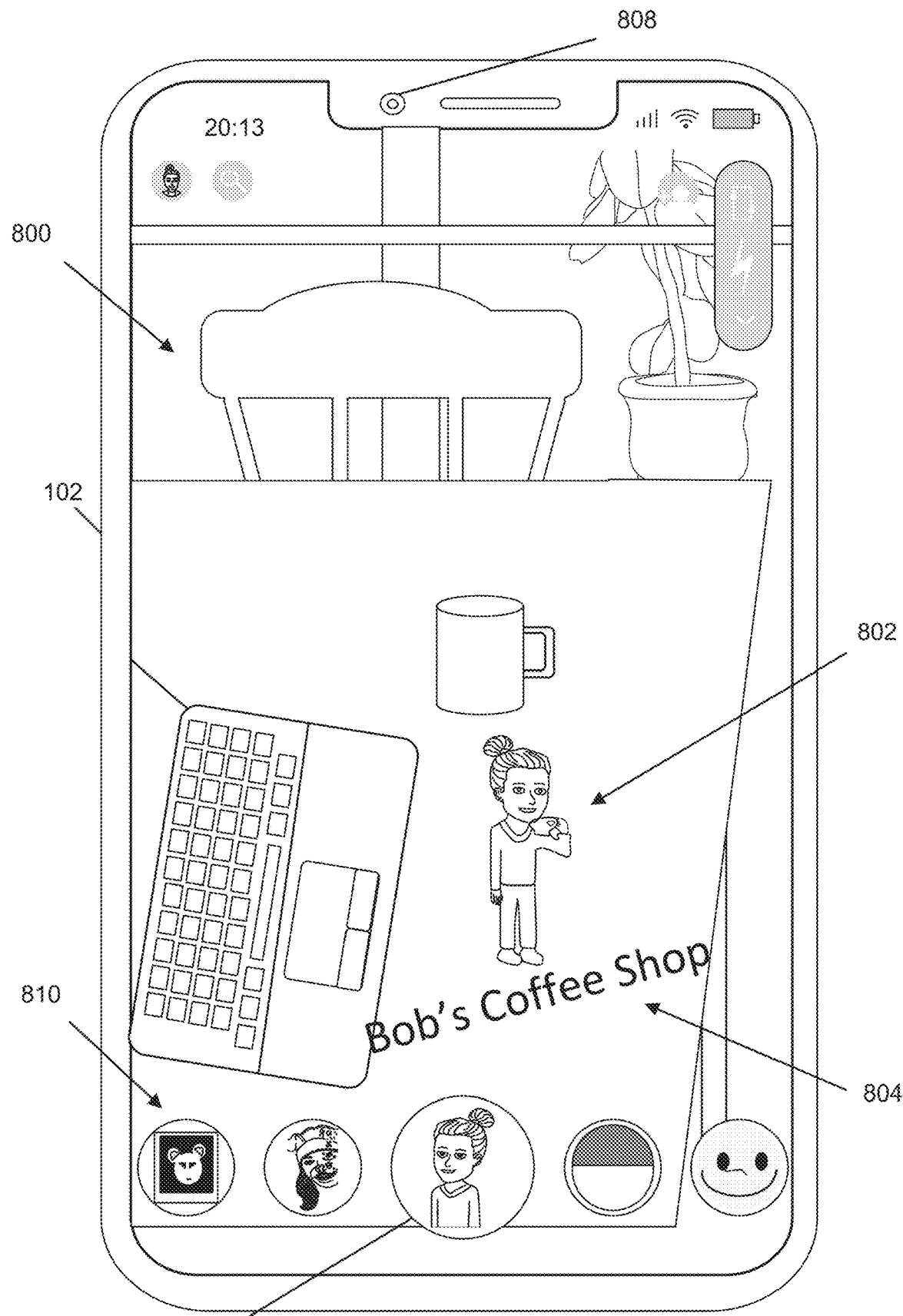
FIG. 8 is an illustration of a user interface that includes an avatar of a user of a client application, information about the location of the user, and a user interface element that is selectable to share the location of the user, according to one or more example implementations.

FIG. 8 is an illustration of a client device 102 that displays a user interface 800 that includes an avatar 802 of a user of a client application, location information 804 about the location of the user, and an avatar-based location sharing user interface element 806 that is selectable to share the location of the user, according to one or more example implementations. The user interface 800 may be displayed via a display device of the client device 102. In addition, the user interface 800 may be displayed by a client application, such as the client application 104, that includes at least one of messaging functionality or social networking functionality. In one or more examples, the user interface 800 may include user content that is captured within a field of view of at least one camera 808 of the client device 102. In various examples, the user content may be captured at a location of the user and may include one or more features of the location of the user. In the illustrative example of FIG. 8, the user content displayed in the user interface 800 includes an image captured within Bob's Coffee Shop. The avatar 802 and the location information 804 may be overlays of the image included in the user interface 800.

The avatar-based location sharing user interface element 806 may be one of a plurality of user interface elements 810 included in the user interface 800. In various examples, the plurality of user interface elements 810 may be part of a carousel user interface element that may be used to display a number of user interface elements at a given time. In one or more implementations, the user interface elements included in the carousel user interface element may be modified based on input provided to the client device 102, such as at least one of a swipe left input or a swipe right input. Each of the plurality of user interface elements 810 may be selectable to execute at least one augmented reality content item that is associated with the respective user interface element of the plurality of user interface elements 810. In the illustrative example of FIG. 8, the avatar 802 of the user and the location information 804 may be displayed in response to selection of the avatar-based location sharing user interface element 806.

Figure 9:
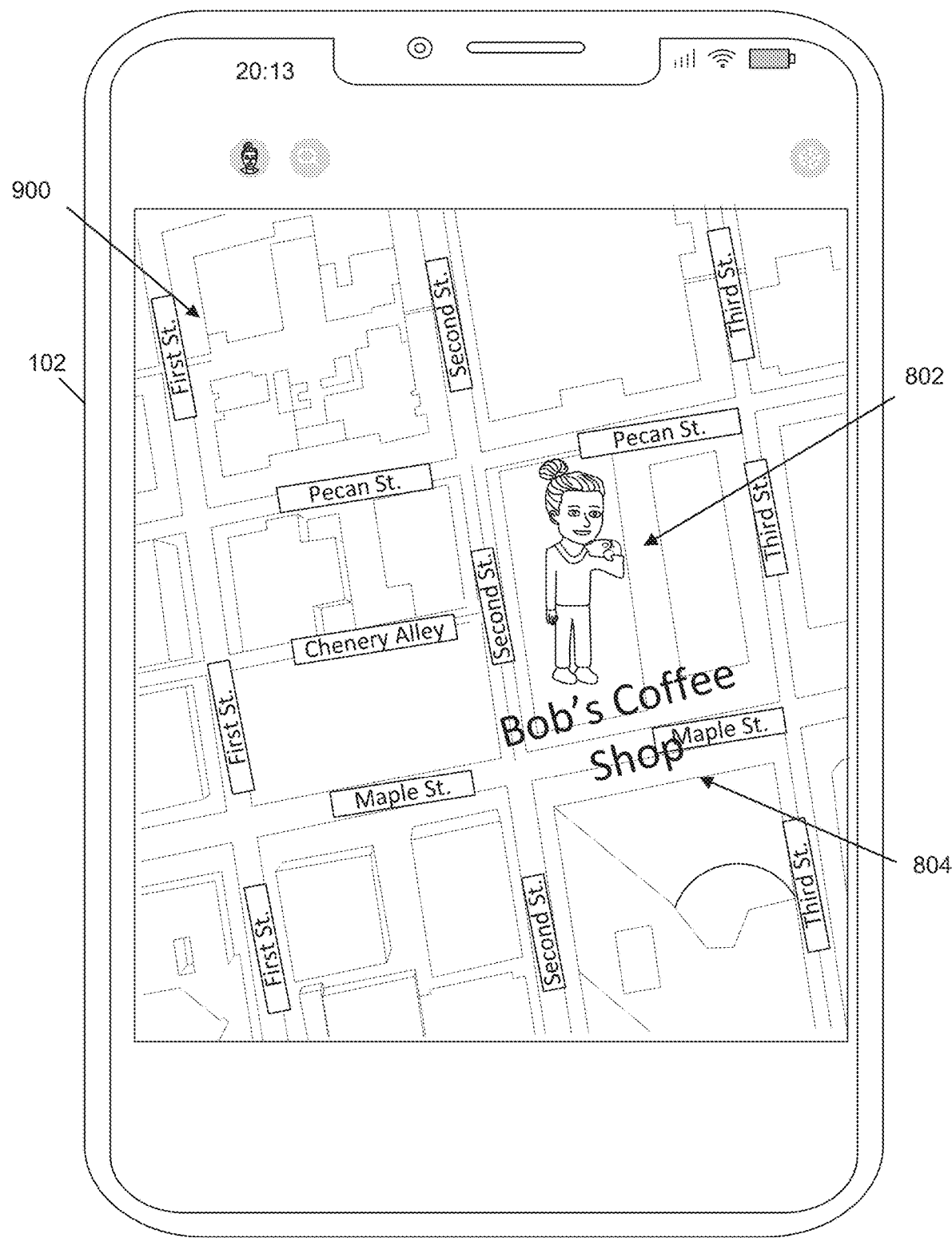
FIG. 9 is an illustration of a user interface that includes a representation of a map and an avatar of a user of a client application that indicates a location of the user, according to one or more example implementations.

FIG. 9 is an illustration of a user interface 900 that includes a representation of a map and an avatar 802 of a user of a client application that indicates a location of the user, according to one or more example implementations. The user interface 900 may be displayed via a display device of the client device 102. In addition, the user interface 900 may be displayed by a client application, such as the client application 104, that includes at least one of messaging functionality or social networking functionality. In one or more examples, the user interface 900 may be displayed in response to a request to view a map user interface of the client application.

The user interface 900 includes a number of features of a geographic region. For example, the user interface 900 includes street locations and street names. The user interface 900 also includes locations of buildings. In one or more additional implementations, the map user interface may include geographic features, such as lakes, rivers, mountains, oceans, and so forth. Further, in one or more implementations, the user interface 900 may identify a number of different locations that correspond to businesses or other entities that operate within the geographic region. In the illustrative example of FIG. 9, the avatar 802 of the user of the client application and the location information 804 corresponding to the location of the user may be displayed in the user interface 900 in response to selection of the avatar-based location sharing user interface element 806 of FIG. 8. In this way, the user interface 900 may be displayed by a client device 102 of an additional user of the client application in response to input from the additional user to view a map user interface. In these scenarios, at least one of a server system or the client application may determine that the user of the client application has provided permission to share the location of the user with the additional user. Accordingly, the avatar 802 and the location information 804 are displayed in the user interface 900 in response to the request by the additional user to view the map user interface that includes the geographic region where the user is located.

Figure 10:
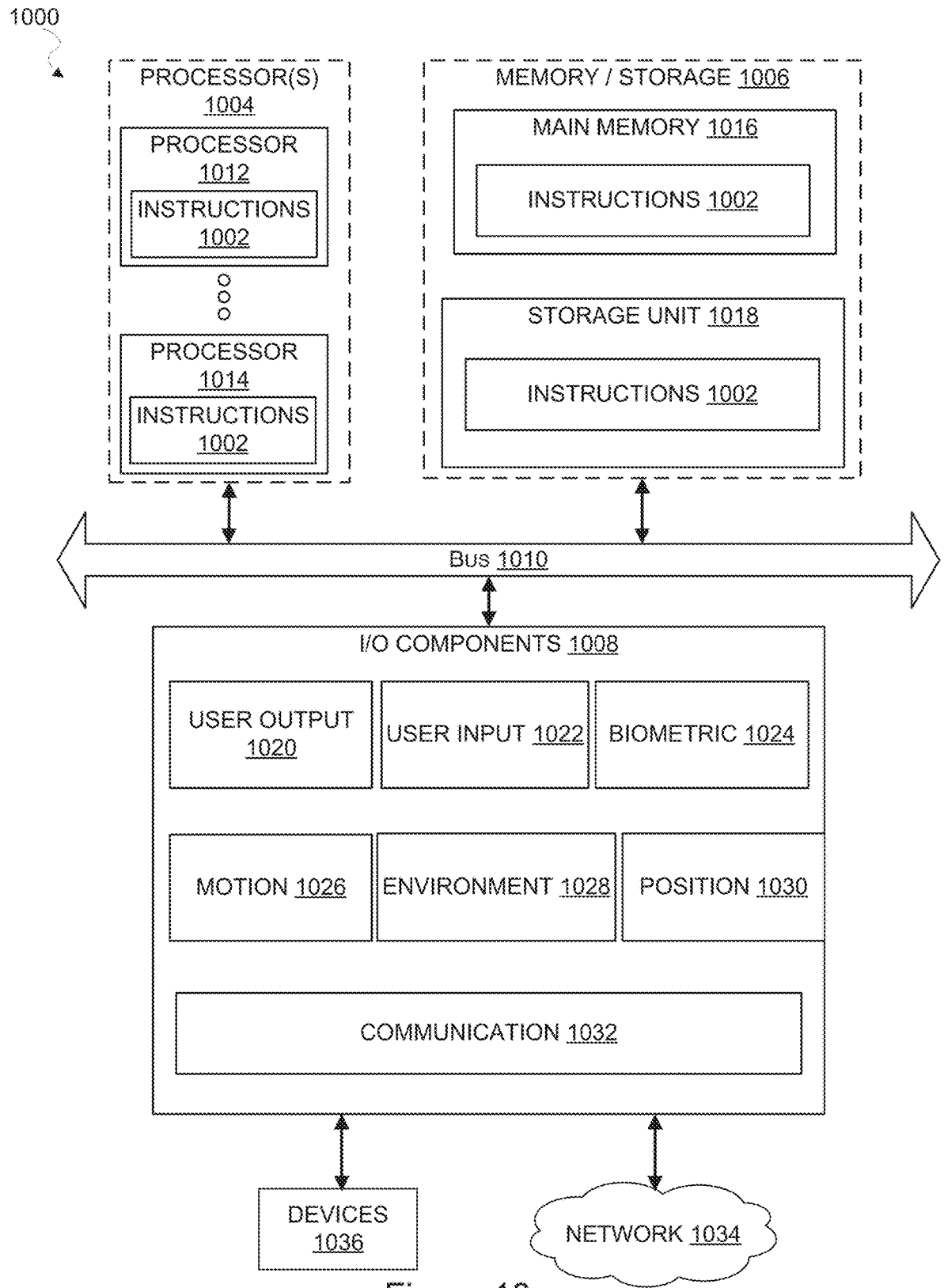
FIG. 10 is a block diagram illustrating components of a machine, in the form of a computer system, that may read and execute instructions from one or more machine-readable media to perform any one or more methodologies described herein, in accordance with one or more example implementations.

FIG. 10 is a block diagram illustrating components of a machine 1000, according to some example implementations, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1002 (e.g., software, a program, an application, an apples, an app, or other executable code) for causing the machine 1000 to perform any one or more of the methodologies discussed herein may be executed. As such, the instructions 1002 may be used to implement modules or components described herein. The instructions 1002 transform the general, non-programmed machine 1000 into a particular machine 1000 programmed to carry out the described and illustrated functions in the manner described. In alternative implementations, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1002, sequentially or otherwise, that specify actions to be taken by machine 1000. Further, while only a single machine 1000 is illustrated, the term "machine" shall also be taken to include a collection of machines that individually or jointly execute the instructions 1002 to perform any one or more of the methodologies discussed herein.

The machine 1000 may include processors 1004, memory/storage 1006, and I/O components 1008, which may be configured to communicate with each other such as via a bus 1010. In an example implementation, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1002. The term "processor" is intended to include multi-core processors 1004 that may comprise two or more independent processors (sometimes referred to as "cores") that may execute instructions 1002 contemporaneously. Although FIG. 10 shows multiple processors 1004, the machine 1000 may include a single processor 1012 with a single core, a single processor 1012 with multiple cores (e.g., a multi-core processor), multiple processors 1012, 1014 with a single core, multiple processors 1012, 1014 with multiple cores, or any combination thereof.

The memory/storage 1006 may include memory, such as a main memory 1016, or other memory storage, and a storage unit 1018, both accessible to the processors 1004 such as via the bus 1010. The storage unit 1018 and main memory 1016 store the instructions 1002 embodying any one or more of the methodologies or functions described herein. The instructions 1002 may also reside, completely or partially, within the main memory 1016, within the storage unit 1018, within at least one of the processors 1004 (e.g., within the processor's cache memory), or any suitable combination thereof, during execution thereof by the machine 1000. Accordingly, the main memory 1016, the storage unit 1018, and the memory of processors 1004 are examples of machine-readable media.

The I/O components 1008 may include a wide variety of components to receive input, provide output, produce output, transmit information, exchange information, capture measurements, and so on. The specific I/O components 1008 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1008 may include many other components that are not shown in FIG. 10. The I/O components 1008 are grouped according to functionality merely for simplifying the following discussion and the grouping is in no way limiting. In various example implementations, the I/O components 1008 may include user output components 1020 and user input components 1022. The user output components 1020 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1022 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 1008 may include biometric components 1024, motion components 1026, environmental components 1028, or position components 1030 among a wide array of other components. For example, the biometric components 1024 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1026 may include acceleration sensor components (e.g., accelerometer), gravitation sensor components, rotation sensor components (e.g., gyroscope), and so forth. The environmental components 1028 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1030 may include location sensor components (e.g., a GPS receiver component), altitude sensor components (e.g., altimeters or barometers that detect air pressure from which altitude may be derived), orientation sensor components, magnetometers), and the like.

Communication may be implemented using a wide variety of technologies. The I/O components 1008 may include communication components 1032 operable to couple the machine 1000 to a network 1034 or devices 1036. For example, the communication components 1032 may include a network interface component or other suitable device to interface with the network 1034. In further examples, communication components 1032 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1036 may be another machine 1000 or any of a wide variety of peripheral devices (e.g., a peripheral device coupled via a USB).

Moreover, the communication components 1032 may detect identifiers or include components operable to detect identifiers. For example, the communication components 1032 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1032, such as location via Internet Protocol (IP) geo-location, location via Wi-Fi® signal triangulation, location via detecting an NFC beacon signal that may indicate a particular location, and so forth.

Figure 11:
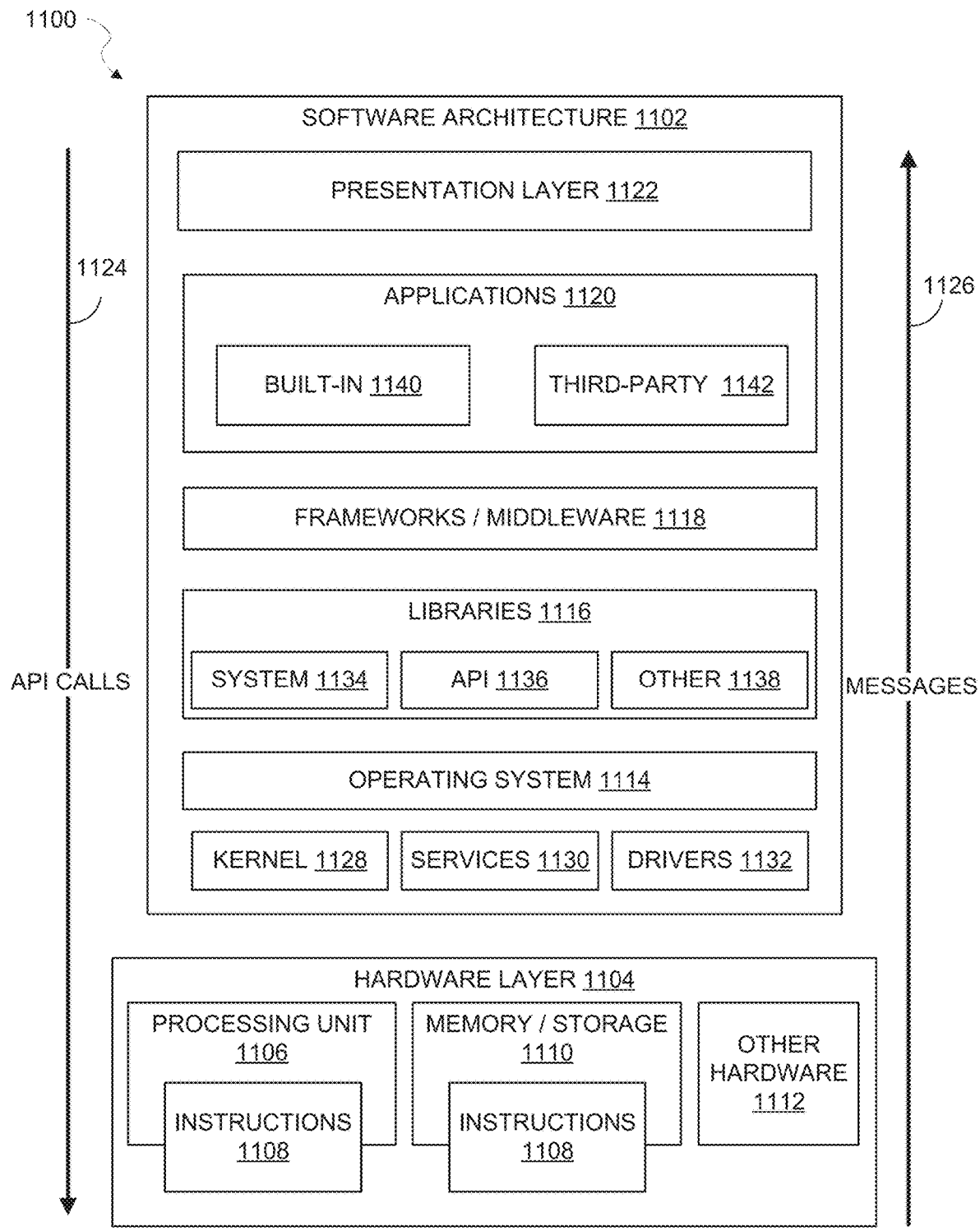
FIG. 11 is block diagram illustrating a representative software architecture that may be used in conjunction with one or more hardware architectures described herein, in accordance with one or more example implementations.

FIG. 11 is a block diagram illustrating system 1100 that includes an example software architecture 1102, which may be used in conjunction with various hardware architectures herein described. FIG. 11 is a non-limiting example of a software architecture and it will be appreciated that many other architectures may be implemented to facilitate the functionality described herein. The software architecture 1102 may execute on hardware such as machine 1000 of FIG. 10 that includes, among other things, processors 1004, memory/storage 1006, and input/output (I/O) components 1008. A representative hardware layer 1104 is illustrated and can represent, for example, the machine 1000 of FIG. 10. The representative hardware layer 1104 includes a processing unit 1106 having associated executable instructions 1108. Executable instructions 1108 represent the executable instructions of the software architecture 1102, including implementation of the methods, components, and so forth described herein. The hardware layer 1104 also includes at least one of memory or storage modules memory/storage 1110, which also have executable instructions 1108. The hardware layer 1104 may also comprise other hardware 1112.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1122. Operationally, the applications 1120 or other components within the layers may invoke API calls 1124 through the software stack and receive messages 1126 in response to the API calls 1124. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 are responsible for controlling or interfacing with the underlying hardware. For instance, the drivers 1132 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 provide a common infrastructure that is used by at least one of the applications 1120, other components, or layers. The libraries 1116 provide functionality that allows other software components to perform tasks in an easier fashion than to interface directly with the underlying operating system 1114 functionality (e.g., kernel 1128, services 1130, drivers 1132). The libraries 1116 may include system libraries 1134 (e.g., C standard library) that may provide functions such as memory allocation functions, string manipulation functions, mathematical functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 (also sometimes referred to as middleware) provide a higher-level common infrastructure that may be used by the applications 1120 or other software components/modules. For example, the frameworks/middleware 1118 may provide various graphical user interface functions, high-level resource management, high-level location services, and so forth. The frameworks/middleware 1118 may provide a broad spectrum of other APIs that may be utilized by the applications 1120 or other software components/modules, some of which may be specific to a particular operating system 1114 or platform.

The applications 1120 include built-in applications 1140 and third-party applications 1142. Examples of representative built-in applications 1140 may include, but are not limited to, a contacts application, a browser application, a book reader application, a location application, a media application, a messaging application, or a game application. Third-party applications 1142 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1142 may invoke the API calls 1124 provided by the mobile operating system (such as operating system 1114) to facilitate functionality described herein.

The applications 1120 may use built-in operating system functions (e.g., kernel 1128, services 1130, drivers 1132), libraries 1116, and frameworks/middleware 1118 to create UIs to interact with users of the system. Alternatively, or additionally, in some systems, interactions with a user may occur through a presentation layer, such as presentation layer 1122. In these systems, the application/component "logic" can be separated from the aspects of the application/component that interact with a user.

Glossary

"CARRIER SIGNAL," in this context, refers to any intangible medium that is capable of storing, encoding, or carrying transitory or non-transitory instructions 1002 for execution by the machine 1000, and includes digital or analog communications signals or other intangible medium to facilitate communication of such instructions 1002. Instructions 1002 may be transmitted or received over the network 110, 1034 using a transitory or non-transitory transmission medium via a network interface device and using any one of a number of well-known transfer protocols.

"CLIENT DEVICE," in this context, refers to any machine 1000 that interfaces to a communications network 110, 1034 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 110, 1034.

"COMMUNICATIONS NETWORK," in this context, refers to one or more portions of a network 110, 1034 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 110, 1034 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX). Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"MACHINE-READABLE MEDIUM," in this context, refers to a component, device, or other tangible media able to store instructions 1002 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" may be taken to include a single medium or multiple media (e.g., a centralized or distributed database, or associated caches and servers) able to store instructions 1002. The term "machine-readable medium" shall also be taken to include any medium, or combination of multiple media, that is capable of storing instructions 1002 (e.g., code) for execution by a machine 1000, such that the instructions 1002, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1004 or other programmable processor. Once configured by such software, hardware components become specific machines (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor 1012, 1014 or processors 1004, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor 1012, 1014 or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 110 (e.g., the Internet) and via one or more appropriate interfaces (e.g., an API). The performance of certain of the operations may be distributed among the processors, not only residing within a single machine 1000, but deployed across a number of machines. In some example implementations, the processors 1004 or processor-implemented components may be located in a single geographic location (e.g., within a home environment, an office environment, or a server farm). In other example implementations, the processors 1004 or processor-implemented components may be distributed across a number of geographic locations.

"PROCESSOR," in this context, refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may, for example, be a CPU, a RISC processor, a CISC processor, a CPU, a DSP, an ASIC, a RFIC or any combination thereof. A processor 1004 may further be a multi-core processor having two or more independent processors 1004 (sometimes referred to as "cores") that may execute instructions 1002 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:

1. A method comprising:
   generating, by one or more computing devices that each include a processor and memory, avatar data of a user of a client application, the avatar data including a plurality of avatars of the user;
   determining, by at least one computing device of the one or more computing devices, that selection of an avatar-based location sharing user interface element has occurred, the avatar-based location sharing user interface element being included in a plurality of user interface elements included in a user interface, the user interface including a live view of user content captured by a camera of a client device of the user, and individual user interface elements of the plurality of user interface elements corresponding to a respective augmented reality content item;
   determining, by at least one computing device of the one or more computing devices, that a location of the user of the client application is an interior of a business in response to analyzing one or more objects included in the live view of the user content;
   determining, by at least one computing device of the one or more computing devices, information that is related to the location of the user;
   analyzing, by at least one computing device of the one or more computing devices, profile data of the user to determine an avatar of the user from among the plurality of avatars of the user, the profile data of the user indicating at least one of one or more first avatars of the user that correspond to the location or one or more second avatars of the user that correspond to the avatar-based location sharing user interface element;
   causing, by at least one computing device of the one or more computing devices and responsive to selection of the avatar-based location sharing user interface element, an augmented reality content item to be executed to apply one or more visual effects to generate modified user content that includes the avatar of the user and the information that is related to the location of the user overlaid on the user content;
   causing, by at least one computing device of the one or more computing devices and responsive to selection of the avatar-based location sharing user interface element, the location of the user to be accessible to one or more additional users of the client application;
   generating, by at least one computing device of the one or more computing devices, additional user interface data that indicates the modified user content and one or more additional user interface elements that correspond to one or more creative tools, the one or more creative tools being different from the respective augmented reality content items corresponding to the plurality of user interface elements;
   receiving, by at least one computing device of the one or more computing devices, input to apply a creative tool of the one or more creative tools to the modified user content;
   generating, by at least one computing device of the one or more computing devices and based on the input, additional modified user content by applying one or more additional visual effects of the creative tool to the modified user content;
   generating, by at least one computing device of the one or more computing devices, a message that includes the additional modified user content; and
   sending, by at least one computing device of the one or more computing devices, the message to one or more recipients of the message.

2. The method of claim 1, further comprising:
   analyzing, by at least one computing device of the one or more computing devices, text content included in the user content to determine the location of the user.

3. The method of claim 1, comprising:
   providing, by at least one computing device of the one or more computing devices, a portal that is accessible to an additional client device of a merchant related to the location, the portal including a template user interface that includes one or more user interface elements that are selectable to capture location information corresponding to the location and to capture input indicating that the location information is to be displayed in response to selection of the avatar-based location sharing user interface element.

4. The method of claim 1, further comprising:
   determining, by at least one computing device of the one or more computing devices, that the location of the user corresponds to an event; and
   wherein analyzing the profile data of the user to determine the avatar of the user from among the plurality of avatars of the user includes determining one or more avatars of the user that are customized to correspond to the event.

5. The method of claim 1, comprising:
   applying, by at least one computing device of the one or more computing devices, one or more object recognition techniques to determine one or more features of the user content;
   performing, by at least one computing device of the one or more computing devices, an analysis of the one or more features of the user content in relation to one or more additional features included in at least one of image content or video content of a respective location;
   determining, by at least one computing device of the one or more computing devices, a measure of similarity between the one or more features of the user content and the one or more additional features of the respective location; and determining, by at least one computing device of the one or more computing devices, that the respective location corresponds to the location of the user based on the measure of similarity being at least a threshold measure of similarity.

6. The method of claim 1, wherein causing the location of the user to be accessible to the one or more additional users of the client application includes:

generating, by at least one computing device of the one or more computing devices, user interface data corresponding to a user interface that includes a map indicating a plurality of locations and indicating the location of the user; and sending, by at least one computing device of the one or more computing devices, the user interface data to an additional client device of an additional user of the one or more additional users of the client application.

7. The method of claim 6, further comprising:

receiving, by at least one computing device of the one or more computing devices, a location data request from the additional client device of the additional user;

generating, by at least one computing device of the one or more computing devices, location sharing data that includes the user interface and location data indicating the location of the user; and sending, by at least one computing device of the one or more computing devices, the location sharing data to the additional client device in response to the location data request.

8. The method of claim 6, wherein the location of the user is indicated on the map by the avatar of the user.

9. The method of claim 1, wherein the avatar of the user is one of a plurality of avatars of the user; and the method further comprising:

identifying, by at least one computing device of the one or more computing devices, the avatar of the user from among the plurality of avatars based on the location of the user.

10. A system comprising:

one or more hardware processors; and one or more non-transitory computer-readable storage media including computer-readable instructions that, when executed by the one or more hardware processors, cause the one or more hardware processors to perform operations comprising:

generating avatar data of a user of a client application, the avatar data including a plurality of avatars of the user;

determining that selection of an avatar-based location sharing user interface element has occurred, the avatar-based location sharing user interface element being included in a plurality of user interface elements included in a user interface, the user interface including a live view of user content captured by a camera of a client device of the user, and individual user interface elements of the plurality of user interface elements corresponding to a respective augmented reality content item;

determining that a location of the user of the client application is an interior of a business in response to analyzing one or more objects included in the live view of the user content;

determining information that is related to the location of the user;

analyzing profile data of the user to determine an avatar of the user from among the plurality of avatars of the user, the profile data of the user indicating at least one of one or more first avatars of the user that correspond to the location or one or more second avatars of the user that correspond to the avatar-based location sharing user interface element;

responsive to selection of the avatar-based location sharing user interface element, causing an augmented reality content item to be executed to apply one or more visual effects to generate modified user content that includes the avatar of the user and the information of the location of the user overlaid on the user content;

responsive to selection of the avatar-based location sharing user interface element, causing the location of the user to be accessible to one or more additional users of the client application;

generating additional user interface data that indicates the modified user content and one or more additional user interface elements that correspond to one or more creative tools, the one or more creative tools being different from the respective augmented reality content items corresponding to the plurality of user interface elements;

receiving input to apply a creative tool of the one or more creative tools to the modified user content;

generating, based on the input, additional modified user content by applying one or more additional visual effects of the creative tool to the modified user content;

generating a message that includes the additional modified user content; and sending the message to one or more recipients of the message.

11. The system of claim 10, wherein the one or more non-transitory computer-readable storage media include additional computer-readable instructions that, when executed by the one or more hardware processors, cause the one or more hardware processors to perform additional operations comprising:

receiving geographic position data from the client device of the user;

analyzing the geographic position data with respect to additional geographic position data of a plurality of locations; and determining that the geographic position data has at least a threshold amount of similarity with respect to a portion of the additional geographic position data that corresponds to the location of the user.

12. The system of claim 11, wherein:

the location of the user is determined based on the geographic position data having at least the threshold amount of similarity with respect to the portion of the additional geographic position data;

the one or more non-transitory computer-readable storage media include additional computer-readable instructions that, when executed by the one or more hardware processors, cause the one or more hardware processors to perform additional operations comprising:

determining an identifier of the location of the user based on the geographic position data; and retrieving location information corresponding to the location based on the identifier of the location of the user; and the location information is displayed in conjunction with the avatar of the user within the user content in response to execution of the augmented reality content item.

13. The system of claim 10, wherein the one or more non-transitory computer-readable storage media include additional computer-readable instructions that, when executed by the one or more hardware processors, cause the one or more hardware processors to perform additional operations comprising:
providing a portal that is accessible to an additional client device of a merchant related to the location, the portal including a template user interface that includes one or more user interface elements that are selectable to capture location information corresponding to the location and to capture input indicating that the location information is to be displayed in response to selection of the avatar-based location sharing user interface element.

14. The system of claim 13, wherein:
the location information includes features of avatars that correspond to the location, the features of the avatars that correspond to the location including at least one of accessories, articles of clothing, poses, facial expressions, or actions;
the one or more non-transitory computer-readable storage media include additional computer-readable instructions that, when executed by the one or more hardware processors, cause the one or more hardware processors to perform additional operations comprising:
causing the avatar of the user to be customized according to one or more of the features that correspond to the location.

15. The system of claim 10, wherein the one or more non-transitory computer-readable storage media include additional computer-readable instructions that, when executed by the one or more hardware processors, cause the one or more hardware processors to perform additional operations comprising:
applying one or more object recognition techniques to determine one or more features of the user content;
performing an analysis of the one or more features of the user content in relation to one or more additional features included in at least one of image content or video content of a respective location;
determining a measure of similarity between the one or more features of the user content and the one or more additional features of the respective location; and
determining that the respective location corresponds to the location of the user based on the measure of similarity being at least a threshold measure of similarity.

16. A method comprising:
capturing, by one or more computing devices that each include a processor and memory, user content using one or more input devices of a client device of a user of a client application;
generating, by at least one computing device of the one or more computing devices, a user interface that includes a plurality of user interface elements and a live view of the user content, individual user interface elements of the plurality of user interface elements corresponding to a respective augmented reality content item;
determining, by at least one computing device of the one or more computing devices, a selection of a user interface element of the plurality of user interface elements that corresponds to an avatar-based location sharing user interface element;
analyzing, by at least one computing device of the one or more computing devices, one or more objects included in the live view of the user content to determine that a location of the user corresponds to an interior of a business;
receiving, by at least one computing device of the one or more computing devices and responsive to the selection of the avatar-based location sharing user interface element, an augmented reality content item that is executable to display an avatar of the user and to display location information corresponding to the location of the user, the avatar of the user being included in a plurality of avatars of the user and the avatar of the user corresponding to at least one of the location or the avatar-based location sharing user interface element as indicated in profile data of the user;
responsive to selection of the avatar-based location sharing user interface element, sending, by at least one computing device of the one or more computing devices, geographic position system information to a server system, the geographic position system information indicating the location of the user;
executing, by at least one computing device of the one or more computing devices, the augmented reality content item to generate a modified version of the user interface that includes modified user content by applying one or more visual effects to the user content, the one or more visual effects including displaying the avatar of the user and the location information as an overlay of the user content;
sending, by at least one computing device of the one or more computing devices and to a server system, the modified user content and an indication to make the location of the user accessible to one or more additional users of the client application;
generating, by at least one computing device of the one or more computing devices, an additional user interface that includes the modified user content and one or more additional user interface elements that correspond to one or more creative tools, the one or more creative tools being different from the respective augmented reality content items corresponding to the plurality of user interface elements;
receiving, by at least one computing device of the one or more computing devices, input to apply a creative tool of the one or more creative tools to the modified user content;
generating, by at least one computing device of the one or more computing devices and based on the input, additional modified user content by applying one or more additional visual effects of the creative tool to the modified user content;
generating, by at least one computing device of the one or more computing devices, a message that includes the additional modified user content; and
sending, by at least one computing device of the one or more computing devices, the message and data indicating one or more recipients of the message to the server system.

17. The method of claim 16, wherein the location information includes features of avatars that correspond to the location, the features of the avatars that correspond to the location including at least one of accessories, articles of clothing, poses, facial expressions, or actions.

18. The method of claim 16, wherein text content included in the user content is analyzed to determine the location of the user.

19. The method of claim 16, further comprising:

displaying, by at least one computing device of the one or more computing devices, a map user interface on a display device, the map user interface corresponding to a geographic region and indicating a location of an additional user of the client application within the geographic region using an avatar of the additional user, and wherein the additional user is a contact of the user within the client application.

20. The method of claim 16, wherein:

the location of the user corresponds to an event; and the avatar of the user is customized to correspond to the event.

\* \* \* \* \*